(12) United States Patent
Hayashi

(10) Patent No.: US 6,911,104 B1
(45) Date of Patent: Jun. 28, 2005

(54) SEALANT FILLING METHODS FOR SEALANT-CONTAINING TIRE AND SEALANT-CONTAINING TIRE TUBE

(75) Inventor: Toyoaki Hayashi, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 435 days.

(21) Appl. No.: 10/130,258

(22) PCT Filed: Nov. 20, 2000

(86) PCT No.: PCT/JP00/08165
§ 371 (c)(1),
(2), (4) Date: Oct. 7, 2002

(87) PCT Pub. No.: WO01/38075
PCT Pub. Date: May 31, 2001

(30) Foreign Application Priority Data

Nov. 24, 1999 (JP) .......................... 11/332321
Apr. 21, 2000 (JP) .......................... 2000/126325
Apr. 21, 2000 (JP) .......................... 2000/126326
Apr. 25, 2000 (JP) .......................... 2000/128969

(51) Int. Cl.[7] .......................................... B29C 73/20
(52) U.S. Cl. ............................. 156/115; 141/7; 141/8
(58) Field of Search ............................ 156/115, 119, 156/87; 152/503–507, DIG. 5; 141/5, 7, 8, 38, 59, 65

(56) References Cited

U.S. PATENT DOCUMENTS 1,689,907 A * 10/1928 Allen .......................... 152/507
2,349,594 A * 5/1944 McMahan .......................... 141/7
2,771,936 A 11/1956 Peterson et al.
2,929,432 A * 3/1960 Kominic et al. ............ 152/415
6,106,647 A 8/2000 Yamagiwa et al.

FOREIGN PATENT DOCUMENTS

| EP | 0 329 454 A2 | 8/1989 |
| EP | 0 816 133 A1 | 1/1998 |
| EP | 0 818 302 A1 | 1/1998 |
| EP | 0 950 505 A2 | 10/1999 |
| EP | 1 034 916 A1 | 9/2000 |
| JP | 58-74342 | 5/1983 |
| JP | 4-5029 | 1/1992 |
| JP | 8-323875 | 12/1996 |
| JP | 9-300481 | 11/1997 |
| JP | 2000-247122 | 9/2000 |
| WO | WO 99/28115 | 6/1999 |

* cited by examiner

Primary Examiner—Geoffrey L. Knable
(74) Attorney, Agent, or Firm—Arent Fox PLLC

(57) ABSTRACT

In a sealant-incorporated tire including a loop-shaped sealant chamber filled with a sealant 5 and defined between a tire body 1 and an inner liner 8 by superposing and adhering the inner liner 8 onto an inner surface of the tire body 1, a sealant charging bore 8a is formed in the inner liner 8, and the sealant 7 is charged into the sealant chamber 6 through the sealant charging bore 8a. Then, air present in the sealant chamber 6 is discharged by evacuation and thereafter, a crude rubber sheet74 is adhered in a state in which the periphery of the sealant charging bore 8a has been clamped, thereby closing the sealant charging bore 8a. Thus, it is possible to charge the sealant 7 in a short time, and also to prevent heat generated during vulcanization and formation of the tire from being applied to the sealant 7, thereby preventing the deterioration of the sealant 5.

21 Claims, 30 Drawing Sheets

FIG.7
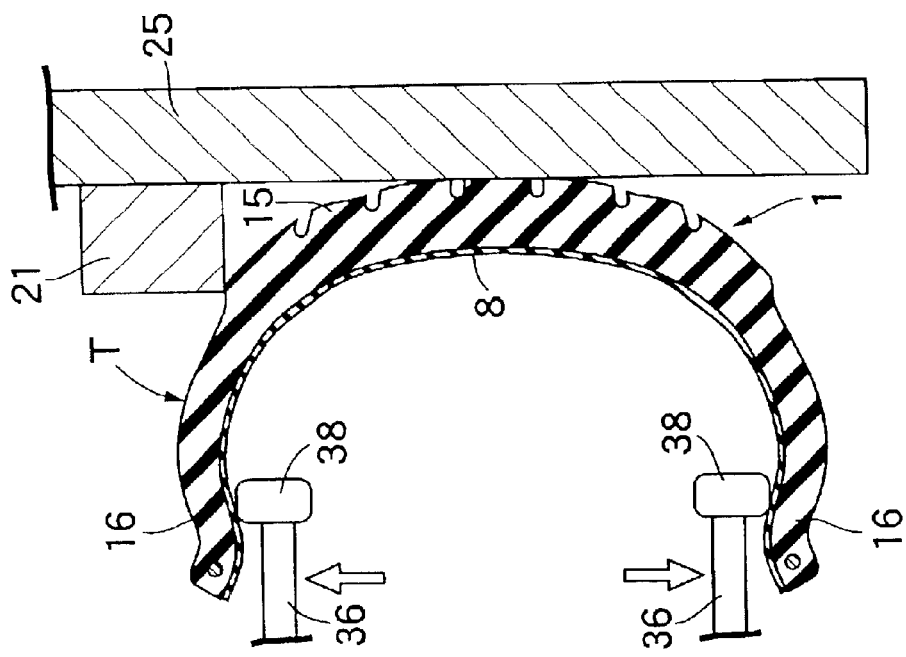
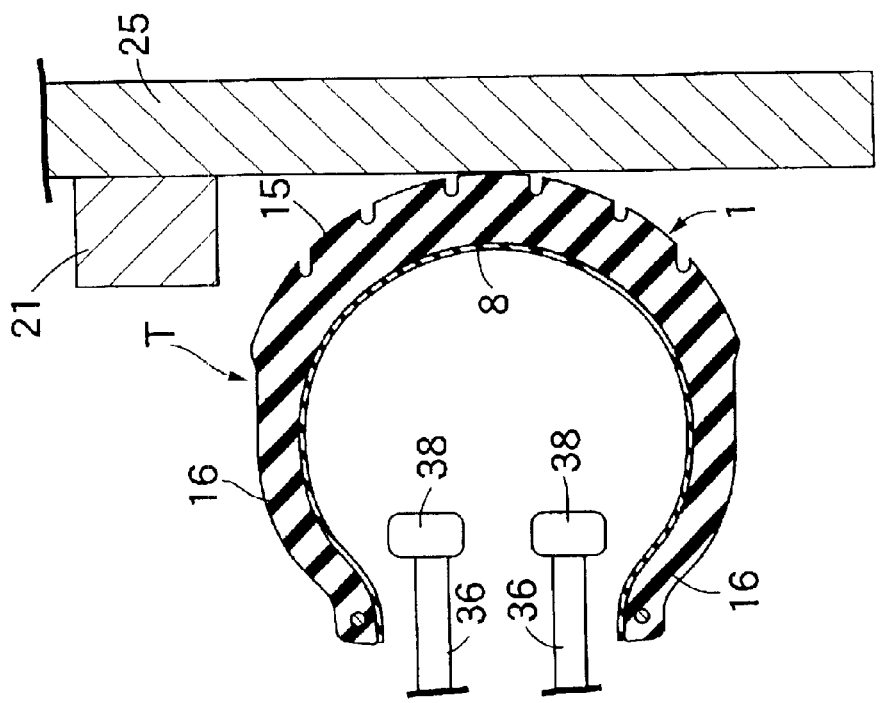

SEALANT FILLING METHODS FOR SEALANT-CONTAINING TIRE AND SEALANT-CONTAINING TIRE TUBE

FIELD OF THE INVENTION

The present invention relates to a sealant-incorporated tire including a loop-shaped sealant chamber defined along an inner peripheral surface of a tire body and partitioned from an air chamber by an inner liner, and a sealant charged in the sealant chamber, and particularly, to a process of charging the sealant into the sealant chamber.

The present invention also relates to a sealant-incorporated tire tube provided therein with an air chamber filled with air and a sealant chamber filled with a sealant, and particularly, to a process of charging the sealant into the sealant chamber.

BACKGROUND ART

There are sealant-incorporated tires known from Japanese Patent Application Laid-open Nos. 4-5029 and 8-323875, in which a sealant chamber is defined inside a tread of a tire body and filled with a sealant, so that the puncture of the tread by a nail or the like is sealed by the sealant encapsulated in the sealant chamber to retard the leakage of air through the puncture.

It should be noted here that in the sealant-incorporated tire described in Japanese Patent Application Laid-open No. 4-5029, the sealant is encapsulated in the sealant chamber at a state of forming a crude tire and for this reason, there is a possibility that the sealant might be deteriorated by heat produced during vulcanization and formation of the tire, resulting in a reduced sealing effect. The sealant-incorporated tire described in Japanese Patent Application Laid-open No. 8-323875 suffers from the following problems: The sealant is charged by a syringe into the sealant chamber in the vulcanized and molded tire and hence, there is not a possibility that the sealant might be deteriorated by heat, but air remains in the sealant chamber, and it takes a long time for charging the sealant.

There are also sealant-incorporated tire tubes known from Japanese Patent Application Laid-open Nos. 58-74342 and 9-300481, in which a sealant is charged into the tire tube, so that the puncture of the tire tube by a nail or the like is sealed by the sealant to retard the leakage of air.

In the tire tube described in Japanese Patent Application Laid-open No. 58-74342, a sealant-incorporated capsule is inserted into the tire tube before being vulcanized and molded, so that the capsule is broken by an external force after vulcanization and molding of the tire tube to disperse the sealant within the tire tube. In the tire tube described in Japanese Patent Application Laid-open No. 9-300481, the sealant is charged into the sealant chamber through a sealant charging bore made in the tire tube in a state in which air has been charged into the air chamber in the tire tube to force the air out of sealant chamber.

In the former sealant charging process, however, there is a possibility that the tire tube might be damaged, when the external force is applied to break the capsule, and moreover, there is a possibility that the sealant might clog a pneumatic valve mounted in the tire tube. The latter sealant charging process suffers from a problem that it is difficult to completely discharge the air present in the sealant chamber, and also it takes a long time for discharging the air out of the sealant chamber.

DISCLOSURE OF THE INVENTION

The present invention has been accomplished with the above circumstances in view, and it is a first object of the present invention to ensure that in a sealant-incorporated tire, a sealant can be reliably charged into a sealant chamber in a short time, while avoiding the deterioration of the sealant, and a sealant charging bore can be reliably closed to prevent the leakage of the sealant, while preventing the damage of an inner liner.

It is a second object of the present invention to ensure that an operation for charging a sealant into a sealant chamber in a tire tube is completed in a short time, while avoiding the incorporation of air, and the charged sealant is reliably prevented from being leaked through a sealant charging bore.

To achieve the above first object, according to the present invention, there is proposed a sealant charging process in a sealant-incorporated tire including a loop-shaped sealant chamber defined along an inner peripheral surface of a tire body and partitioned from an air chamber by an inner liner, and a sealant charged in the sealant chamber, characterized in that the process comprises a first step of forming a sealant charging bore in the inner liner to communicate with the sealant chamber, a second step of charging the sealant into the sealant chamber through the sealant charging bore, a third step of discharging air present in the sealant chamber by evacuation, and a fourth step of closing the sealant charging bore in a state in which the periphery of the sealant charging bore has been clamped.

With the above feature, the sealant charging bore is formed in the inner liner partitioning the air chamber and the sealant chamber from each other in the tire body, and the sealant is charged into the sealant chamber through the sealant charging bore. Therefore, it is possible to charge the sealant in a short time, and also to prevent heat generated upon the vulcanization and formation of the tire from being applied to the sealant, thereby preventing the deterioration of the sealant. In addition, after charging of the sealant into the sealant chamber, the air present in the sealant chamber is discharged and then, the sealant charging bore is closed. Therefore, it is possible to prevent the air from remaining in the sealant chamber to reduce the sealing performance. Moreover, the sealant charging bore is closed in a state in which the periphery of the sealant charging bore has been clamped, and hence, it is possible to prevent the air from entering again into the sealant chamber through the sealant charging bore during closing the sealant charging bore.

To achieve the first object, in addition to the above feature, there is proposed a sealant charging process in a sealant-incorporated tire, wherein the first step comprises forming the sealant charging bore in the inner liner by an edge tool mounted for advancing and retracting movements within a suction cup connected to a vacuum source in a state in which the inner surface of the inner liner has been attracted and fixed by the suction cup.

With the above feature, when the sealant charging bore is formed in the inner liner by the edge tool, the inner surface of the inner liner is attracted and fixed by the suction cup. Therefore, the inner liner can be prevented from being moved or deformed by a load received from the edge tool, whereby the sealant charging bore can be formed accurately.

To achieve the first object, in addition to the above feature, there is proposed a sealant charging process in a sealant-incorporated tire, wherein the fourth step comprises closing the sealant charging bore by adhesion of a crude rubber sheet in a state in which the periphery of the sealant charging bore has been clamped.

With the above feature, the sealant charging bore is closed by adhesion of the crude rubber sheet in the state in which the periphery of the sealant charging bore has been clamped. Therefore, it is possible to prevent the displacement of a position of adhesion of the crude rubber sheet, thereby ensuring a quality of an adhesive joint, while preventing the air from entering again into the sealant chamber through the sealant charging bore.

To achieve the first object, in addition to the above feature, there is proposed a sealant charging process in a sealant-incorporated tire, wherein the fourth step comprises clamping the periphery of the sealant charging bore, while discharging the air present in the sealant chamber by evacuation, buffing the periphery of the sealant charging bore in a state in which the periphery has been clamped, and closing the sealant charging bore by adhesion of a crude rubber sheet.

With the above feature, the crude rubber sheet is adhered in the state in which the periphery of the sealant charging bore has been clamped. Therefore, it is possible to prevent the displacement of a position of adhesion of the crude rubber sheet to ensure a quality of an adhesive joint, while preventing the air from entering again into the sealant chamber through the sealant charging bore in the course of adhering. Moreover, the periphery of the sealant charging bore is buffed in its clamped state and hence, it is possible to prevent the inner liner from being damaged by a buffing load, and also to remove oil or stain to enhance the adhesive strength of the crude rubber sheet.

To achieve the first object, in addition to the above feature, there is proposed a sealant charging process in a sealant-incorporated tire, wherein the fourth step comprises closing the sealant charging bore by a thermosetting resin or a hot-melt resin in a state in which the periphery of the sealant charging bore has been clamped.

With the above feature, the sealant charging bore is closed by the thermosetting resin or the hot-melt resin in the state in which the periphery of the sealant charging bore has been clamped. Therefore, the sealant charging bore can be closed in an extremely short time, while preventing the air from entering again into the sealant chamber through the sealant charging bore.

To achieve the first object, in addition to the above feature, there is proposed a sealant charging process in a sealant-incorporated tire, wherein the fourth step comprises clamping the periphery of the sealant charging bore, while discharging the air present in the sealant chamber by evacuation, buffing the periphery of the sealant charging bore in a state in which the periphery has been clamped, and closing the sealant charging bore by a thermosetting resin or a hot-melt resin.

With the above feature, the sealant charging bore is closed by the thermosetting resin or the hot-melt resin in the state in which the periphery of the sealant charging bore has been clamped. Therefore, the sealant charging bore can be closed in an extremely short time, while preventing the air from entering again into the sealant chamber through the sealant charging bore. Moreover, the periphery of the sealant charging bore is buffed in its clamped state and hence, it is possible to prevent the inner liner from being damaged by a buffing load, and also to remove oil or a stain to enhance the closing strength provided by the thermosetting resin or the hot-melt resin.

To achieve the first object, in addition to the above feature, there is proposed a sealant charging process in a sealant-incorporated tire, wherein the loop-shaped sealant chamber is defined by connecting opposite ends of the inner liner to the inner peripheral surface of the tire body.

With the above feature, the sealant chamber to be filled with the sealant can be defined only by connecting the opposite ends of the inner liner to the inner peripheral surface of the tire body.

To achieve the first object, in addition to the above feature, there is proposed a sealant charging process in a sealant-incorporated tire, wherein the loop-shaped sealant chamber is defined by adhering a first inner liner to the entire inner peripheral surface of the tire body, and connecting opposite ends of a second inner liner to an inner peripheral surface of the first inner liner.

With the above feature, the sealant chamber to be filled with the sealant can be defined only by adhering a first inner liner to the entire inner peripheral surface of the tire body, and connecting opposite ends of a second inner liner to an inner peripheral surface of the first inner liner.

To achieve the second object, according to the present invention, there is proposed a sealant charging process in a sealant-incorporated tire tube provided therein with an air chamber filled with air and a sealant chamber filled with a sealant, characterized in that the process comprises a first step of forming a sealant charging bore in an outer peripheral wall of the tire tube to communicate with the sealant chamber, a second step of charging the sealant into the sealant chamber through the sealant charging bore, a third step of discharging air present in the sealant chamber by evacuation, and a fourth step of closing the sealant charging bore in a state in which a periphery of the sealant charging bore has been clamped.

With the above feature, the sealant is charged in the state in which the air present in the sealant chamber has been discharged by evacuation. Therefore, the sealant can be charged in a short time without incorporation of air into the sealant. Moreover, the sealant charging bore is closed in the state in which the periphery of the sealant charging bore has been clamped and hence, it is possible to prevent the air from entering again into the sealant chamber during closing of the sealant charging bore, thereby ensuring a stable sealing performance.

To achieve the second object, in addition to the above feature, there is proposed a sealant charging process in a sealant-incorporated tire tube, wherein the first step comprises forming the sealant charging bore in the outer peripheral wall of the tire tube by a hot nail in a state in which an inner peripheral wall of the tire tube has been supported.

With the above feature, the inner peripheral wall of the tire tube is supported, and the sealant charging bore is formed in the outer peripheral wall of the tire tube by the hot nail. Therefore, the sealant charging bore can be formed simply and reliably.

To achieve the second object, in addition to the above feature, there is proposed a sealant charging process in a sealant-incorporated tire tube, wherein the fourth step comprises closing the sealant charging bore by adhesion of a crude rubber sheet in a state in which the periphery of the sealant charging bore has been clamped.

With the above feature, the sealant charging bore is closed by adhesion of the crude rubber sheet in the state in which the periphery of the sealant charging bore has been clamped. Therefore, it is possible to prevent the displacement of a position of adhesion of the crude rubber sheet to ensure a quality of an adhesive joint, while preventing the air from entering again into the sealant chamber through the sealant charging bore.

To achieve the second object, in addition to the above feature, there is proposed a sealant charging process in a sealant-incorporated tire tube, wherein the fourth step comprises clamping the periphery of the sealant charging bore, while discharging the air present in the sealant chamber by evacuation, buffing the periphery of the sealant charging bore in a state in which the periphery has been clamped, and closing the sealant charging bore by adhesion of a crude rubber sheet.

With the above feature, the crude rubber sheet is adhered in the state in which the periphery of the sealant charging bore has been clamped and hence, it is possible to prevent the displacement of a position of adhesion of the crude rubber sheet to ensure a quality of an adhesive joint, while preventing the air from entering again into the sealant chamber through the sealant charging bore in the course of adhering. Moreover, the periphery of the sealant charging bore is buffed in its clamped state and hence, it is possible to prevent the tire tube from being damaged by a buffing load, and also to remove oil and a stain to enhance the adhesive strength of the crude rubber sheet.

To achieve the second object, in addition to the above feature, there is proposed a sealant charging process in a sealant-Incorporated tire tube, wherein the fourth step comprises closing the sealant charging bore by a thermosetting resin or a hot-melt resin in a state in which the periphery of the sealant charging bore has been clamped.

With the above feature, the sealant charging bore is closed by the thermosetting resin or the hot-melt resin in the state in which the periphery of the sealant charging bore has been clamped. Therefore, the sealant charging bore can be closed in an extremely short time, while preventing the air from entering again into the sealant chamber through the sealant charging bore.

To achieve the second object, in addition to the above feature, there is proposed a sealant charging process in a sealant-incorporated tire tube, wherein the fourth step comprises clamping the periphery of the sealant charging bore, while discharging the air present in the sealant chamber by evacuation, buffing the periphery of the sealant charging bore in a state in which the periphery has been clamped, and closing the sealant charging bore by a thermosetting resin or a hot-melt resin.

With the above feature, the sealant charging bore is closed by the thermosetting resin or the hot-melt resin in the state in which the periphery of the sealant charging bore has been clamped. Therefore, it is possible to close the sealant charging bore in an extremely short time, while preventing the air from entering again into the sealant chamber through the sealant charging bore. Moreover, the periphery of the sealant charging bore is buffed in its clamped state and hence, it is possible to prevent the tire tube from being damaged by a buffing load, and also to remove oil and a stain to enhance the closing strength provided by the thermosetting resin or the hot-melt resin.

To achieve the second object, in addition to the above feature, there is proposed a sealant charging process in a sealant-incorporated tire tube, wherein the second step comprises inserting a sealant injecting hose into the sealant chamber through the sealant charging bore, and supplying air into the air chamber in the tire tube and then charging the sealant into the sealant chamber through the sealant injecting hose, while discharging the air from the air chamber.

With the above feature, after the air is supplied into the air chamber in the tire tube to force the air out of the sealant chamber, the sealant is charged into the sealant chamber. Therefore, the sealant can be charged in a short time without incorporation of the air into the sealant. Particularly, the air in the air chamber is discharged when the sealant is charged into the sealant chamber, and hence, the sealant can be supplied easily without application of a strong pressure.

To achieve the second object, in addition to the above feature, there is proposed a sealant charging process in a sealant-incorporated tire tube, wherein the first step of forming the sealant charging bore in the outer peripheral wall of the tire tube is carried out in a process of producing the tire tube.

With the above feature, the sealant charging bore is formed in the outer peripheral wall of the tire tube in the tire tube producing process and hence, the number of steps for forming the sealant charging bore is reduced.

To achieve the second object, according to the present invention, there is proposed a sealant charging process in a sealant-incorporated tire tube provided therein with an air chamber filled with air and a sealant chamber filled with a sealant, characterized in that the process comprises a first step of forming a sealant charging bore in an outer peripheral wall of the tire tube to communicate with the sealant chamber, a second step of inserting a sealant injecting hose into the sealant chamber through the sealant charging bore and supplying air into the air chamber through a pneumatic valve mounted in the tire tube, a third step of charging the sealant into the sealant chamber through the sealant injecting hose, while discharging the air present in the air chamber through the pneumatic valve, a fourth step of buffing the periphery of the sealant charging bore in a state in which the periphery has been clamped, and a fifth step of closing the sealant charging bore by a thermosetting resin or a hot-melt resin in a state in which the periphery of the sealant charging bore has been clamped.

With the above feature, after the air is supplied into the air chamber through the pneumatic valve to force the air out of the sealant chamber, the sealant is charged into the sealant chamber. Therefore, the sealant can be charged in a short time without incorporation of the air in the sealant. Particularly, the air in the air chamber is discharged when the sealant is charged into the sealant chamber, and hence, the sealant can be supplied easily without application of a strong pressure. In addition, the sealant charging bore is closed by the thermosetting resin or the hot-melt resin in the state in which the periphery thereof has been clamped and hence, the sealant charging bore can be closed in an extremely short time, while preventing the air from entering again into the sealant chamber through the sealant charging bore. Moreover, the periphery of the sealant charging bore is buffed in its clamped state and hence, it is possible to prevent the tire tube from being damaged by a buffing load, and also to remove oil and a stain to enhance the closing strength provided by the thermosetting resin or the hot-melt resin.

To achieve the second object, in addition to the above feature, there is proposed a sealant charging process in a sealant-incorporated tire tube, wherein the fifth step comprises depositing the thermosetting resin to the periphery of the sealant charging bore and then heating and pressing the thermosetting resin to close the sealant charging bore.

With the above feature, the thermosetting resin is deposited to the periphery of the sealant charging bore and then heated and pressed to close the sealant charging bore. Therefore, the thermosetting resin is smoothly integrated with the tire tube, leading to an enhanced appearance.

To achieve the second object, according to the present invention, there is proposed a sealant charging process in a sealant-Incorporated tire tube provided therein with an air chamber filled with air and a sealant chamber filled with a sealant, characterized in that the process comprises a first step of forming a sealant charging bore in an outer peripheral wall of the tire tube to communicate with the sealant chamber, a second step of inserting a sealant injecting hose into the sealant chamber through the sealant charging bore and supplying air into the air chamber through a pneumatic valve mounted in the tire tube, a third step of charging the sealant into the sealant chamber through the sealant injecting hose, while discharging the air present in the air chamber through the pneumatic valve, a fourth step of buffing the periphery of the sealant charging bore in a state in which the periphery has been clamped, and a fifth step of closing the sealant charging bore by adhesion of a crude rubber sheet in a state in which the periphery of the sealant charging bore has been clamped.

With the above feature, the sealant is charged into the sealant chamber after supplying of the air to the air chamber through the pneumatic valve to force the air out of the sealant chamber. Therefore, the sealant can be charged in a short time without incorporation of the air into the sealant. Particularly, the air in the air chamber is discharged when the sealant is charged into the sealant chamber, and hence, the sealant can be supplied easily without application of a strong pressure. In addition, the sealant charging bore is closed by the crude rubber sheet in the state in which the periphery of the sealant charging bore has been clamped. Therefore, the sealant charging bore can be closed in an extremely short time, while preventing the air from entering again into the sealant chamber through the sealant charging bore. Moreover, the periphery of the sealant charging bore is buffed in its clamped state and hence, it is possible to prevent the tire tube from being damaged by a buffing load, and also to remove oil and stain to enhance the closing strength provided by the thermosetting resin or the hot-melt resin.

To achieve the second object, in addition to the above feature, there is proposed a sealant charging process in a sealant-incorporated tire tube, wherein the fifth step comprises a stage of clamping the periphery of the sealant charging bore, while discharging the air present in the sealant chamber by evacuation, a stage of buffing the periphery of the sealant charging bore in a state in which the periphery has been clamped, and a stage of closing the sealant charging bore by adhesion of a crude rubber sheet.

With the above feature, the crude rubber sheet is adhered in the state in which the periphery of the sealant charging bore has been clamped and hence, it is possible to prevent the displacement of a position of adhesion of the crude rubber sheet to ensure a quality of an adhesive joint, while preventing the air from entering again into the sealant chamber through he sealant charging bore in the course of adhering. Moreover, the periphery of the sealant charging bore is buffed in its clamped state and hence, it is possible to prevent the tire tube from being damaged by a buffing load, and also to remove oil and a stain to enhance the adhesive strength of the crude rubber sheet.

To achieve the second object, in addition to the above feature, there is proposed a sealant charging process in a sealant-incorporated tire tube, wherein the first step of forming the sealant charging bore in the outer peripheral wall of the tire tube is carried out in a process of producing the tire tube.

With the above feature, the sealant charging bore is formed in the outer peripheral wall of the tire tube in the tire tube producing process and hence, the number of steps for forming the sealant charging bore is reduced.

BRIEF DESCRIPTION OF THE DRAWINGS

FIGS. 1 to 17 show a first embodiment of the present invention. FIG. 1 is a cross-sectional view of a wheel having a tire mounted thereto;

FIG. 2 is a perspective view of the entire arrangement of a sealant charging apparatus;

FIG. 3 is a view taken along a line 3—3 in FIG. 2;

FIG. 4 is a view for explaining a state in which a clamp unit is in service;

FIG. 5 is a view taken in the direction of an arrow 5 in FIG. 4;

FIG. 6 is a view for explaining a state in which the clamp unit and a vacuum unit are in service;

FIG. 7 is a view for explaining the operation of a side wall-spreading unit;

FIG. 8 is a view for explaining the operation of a sealant charging bore-forming unit;

FIG. 9 is a view for explaining the operation at a sealant charging step;

FIG. 10 is a view for explaining the operation of a clamp head;

FIG. 11 is a view for explaining the operation of the vacuum unit;

FIG. 12 is an enlarged view of an essential portion shown in FIG. 11;

FIG. 13 is a sectional view taken along a line 13—13 in FIG. 12;

FIG. 14 is a view for explaining the operation of the clamp head;

FIG. 15 is a view for explaining the operation of a buff unit; FIG. 16 is a view for explaining the operation of a sealant charging bore-closing unit; and FIG. 17 is a vertical sectional view of a tire having a sealant charged therein.

FIG. 18 is a vertical sectional view of a vacuum head; and FIG. 19 is a sectional view taken along a line 19—19 in FIG. 18.

FIG. 20 is a view for explaining the operation of a sealer supply nozzle; and FIG. 21 is a view for explaining the operation of a forming die.

FIG. 22 is a view for explaining the operation at an injecting step using a forming die; and FIG. 23 is a view for explaining a cooling step using the forming die.

FIGS. 25 to 27G show a sixth embodiment of the present invention. FIG. 25 is a cross-sectional view of a wheel provided with a tube-incorporated tire; FIG. 26 is a sectional view taken along a line 26—26 in FIG. 25; and FIGS. 27A to 27G are views for explaining a sealant charging process.

BEST MODE FOR CARRYING OUT THE INVENTION

A first embodiment of the present invention will now be described with reference to FIGS. 1 to 17.

Figure 1:
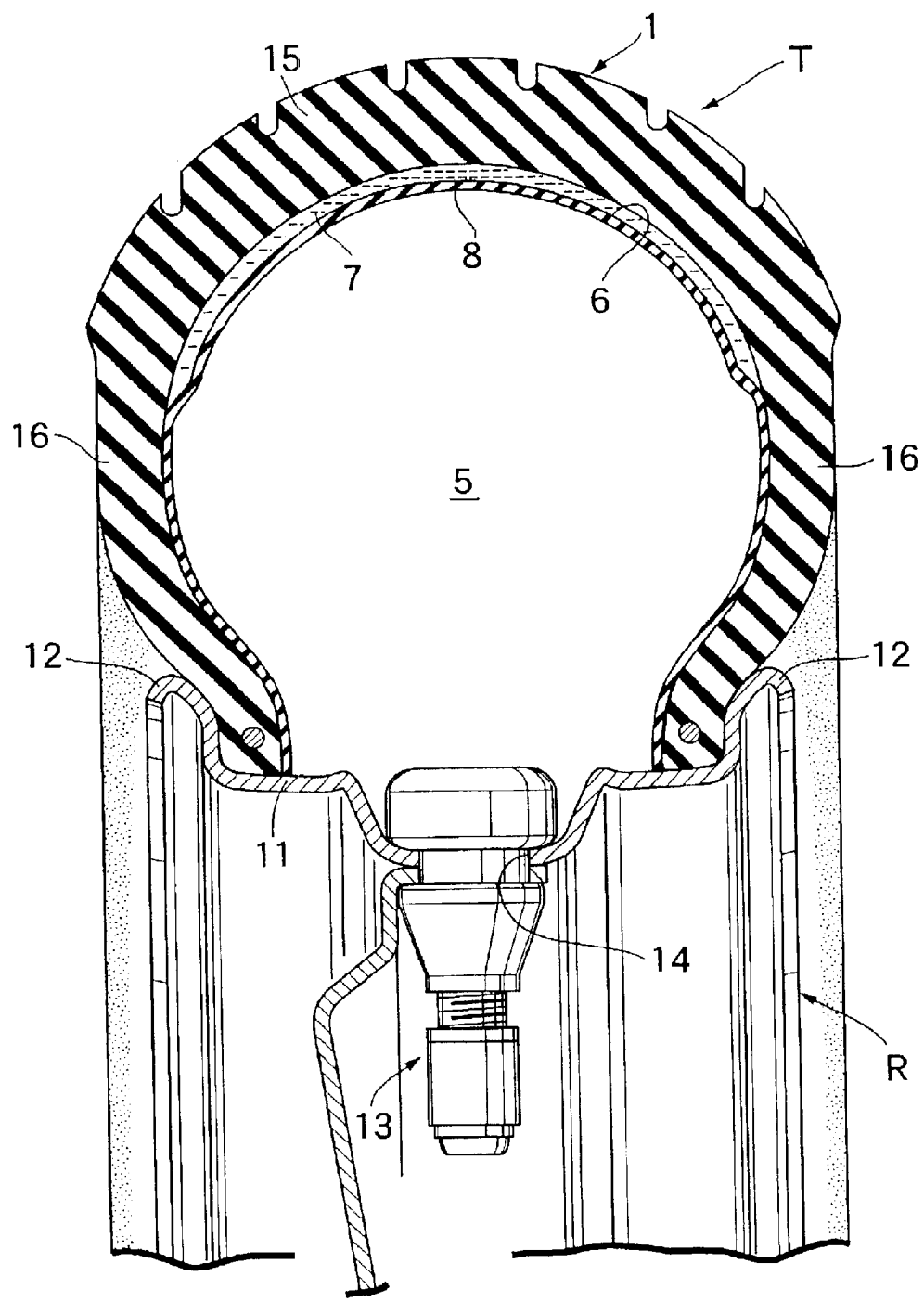

As shown in FIG. 1. a tubeless tire T is mounted to a rim R of a wheel for a motorcycle, and comprises a tire body 1, and an inner liner 8 adhered in a vulcanized manner to the inside of the tire body 1. Laterally opposite sides of the inner liner 8 excluding a central portion are adhered in the vulcanized manner to the inner surface of the tire body 1, and an air chamber 5 substantially circular in section is defined inside the inner liner 8. A sealant chamber 6 substantially arcuate in section is defined between a non-adhered portion of the inner liner 8 and the inner surface of the tire body 1. A known liquid sealant 7 is charged in the sealant chamber 6.

The rim R includes an annular rim body 11 extending in a circumferential direction of the tire T, and a pair of flange portions 12, 12 extending radially outwards from widthwise opposite ends of the rim body 11 to retain the circumference of the tire body 1. A pneumatic valve 13 for charging air into the air chamber 5 defined inside the inner liner 8 is supported through a pneumatic valve-mounting portion 14 formed at a circumferentially one point on the rim body 11.

The sealant chamber 6 defined between the tire body 1 and the inner liner 8 is retained in a loop shape to extend along an inner side of a tread 15 by an air pressure in the air chamber 5. Therefore, even if the tire body 1 is punctured radially or sideways by a nail or the like, the sealant 7 fills the puncture immediately to repair it, thereby retarding the leakage of air from the air chamber 5. The sealant 7 is retained in the sealant chamber 6 and cannot issue out into the air chamber 5 and hence, the pneumatic valve 13, a pressure gauge applied to the pneumatic valve 13 and the like cannot be clogged.

The entire structure of a sealant charging apparatus for charging the sealant 7 into the sealant chamber 6 in the tubeless tire T will be described with reference to FIGS. 2 to 6.

Figure 2:
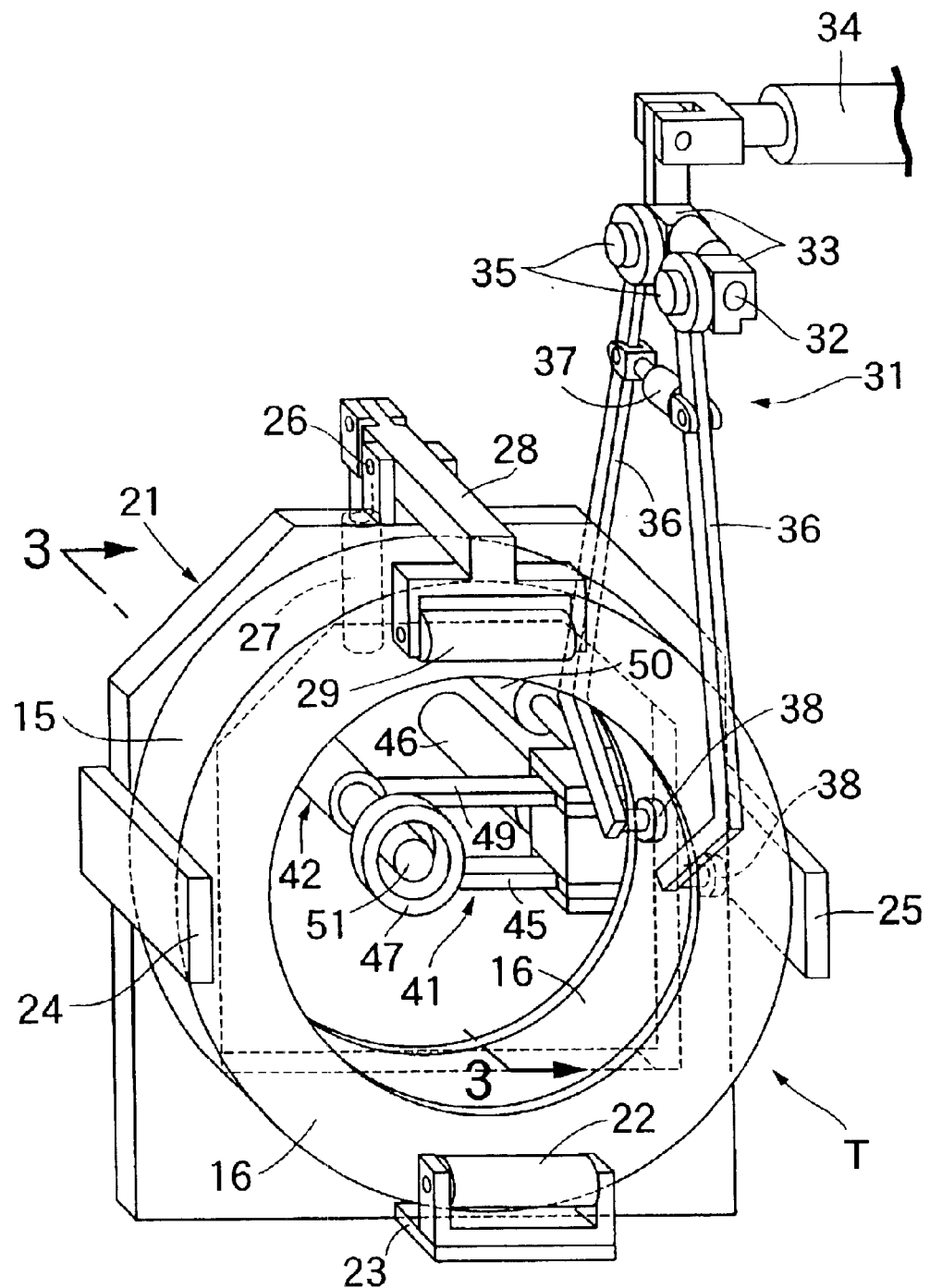
Figure 3:
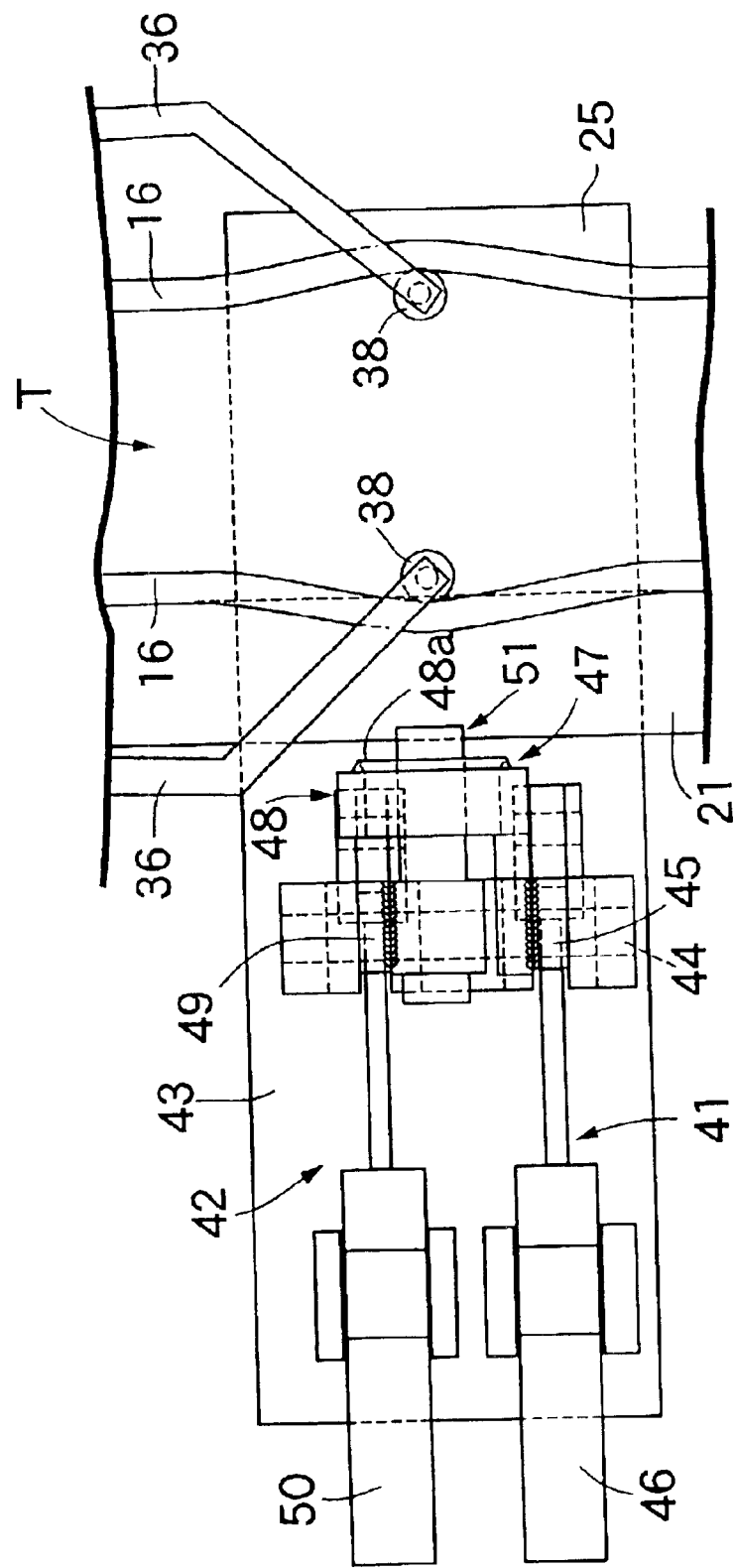

As shown in FIG. 2, the sealant charging apparatus includes a plate-shaped base frame 21 mounted to rise vertically. The base frame 21 includes a bottom support plate 23 having a fixing and positioning roller 22, a pair of left and right side-supporting plates 24 and 25, and a movable positioning roller 29 mounted at a tip end of an arm 28 which is pivotally supported on a pivot 26 mounted on an upper surface of the base frame 21 and is swung by a cylinder 27. When the tire T is placed on an upper surface of the bottom support plate 23 with its side wall 16 retained on the fixing and positioning roller 22, the tire T is fixed in a stand-up attitude to extend along the base frame 21 in such a manner that the tread 15 at a height-wise intermediate portion thereof is retained on the side-supporting plates 24 and 25, and the side wall 16 at an upper end thereof is retained on the movable positioning roller 29.

The charging of the sealant 7 is carried out at a position in the vicinity of one 25 of the side-supporting plates and hence, a sidewall spreading unit 31 is provided for spreading out the left and right sidewalls 16 of the tire T at such position. The sidewall spreading unit 31 includes a pair of swingable blocks 33, 33 pivotally supported for swinging movement about a pivot 32, a cylinder 34 for swinging the swingable blocks 33, 33 in unison with each other, arms 36, 36 pivotally supported on the swingable blocks 33, 33 through pivots 35, 35, respectively, a cylinder 37 for swingably moving the arms 36, 36 away from and toward each other, and rollers 38, 38 mounted at tip ends of the arms 36, 36 and capable of abutting against inner surfaces of the sidewalls 16, 16 of the tire T, respectively.

Mounted side by side behind the base frame 21 are a clamp unit 41 for pressing the tread 15 of the tire T to the one side-supporting plate 25 and clamping the tread 15, and a vacuum unit 42 for evacuating air remaining in the sealant chamber 6 after charging of the sealant 7 into the sealant chamber 6.

As shown in FIGS. 3 to 6, the clamp unit 41 includes an arm 45 pivotally supported on a frame 43 integrally extending from the one side-supporting plate 25 through a pivot 44, and a cylinder 46 supported on the frame 43 for swinging the arm 45 about the pivot 44. A cylindrical clamp head 47 is fixed to a tip end of the arm 45 and provided with an annular clamp portion 48 capable of abutting against the inner surface of the inner liner 8 of the tire T. An urging projection 48a (see FIG. 10) having a triangular shape in section is provided on the clamp portion 48 to protrude therefrom.

The vacuum unit 42 includes an arm 49 pivotally supported on the frame 43 through the pivot 44, and a cylinder 50 supported on the frame 43 for swinging the arm 49 about the pivot 44. A vacuum head 51 is mounted at a tip end of the arm 49 and includes a seal pad 52 which is formed into a cylindrical shape from an elastic material and which is capable of being coaxially fitted into the clamp head 47, a substantially cylindrical urging member 53 coaxially fitted to an inner periphery of the seal pad 52, a space 54 defined within the urging member 53, and a vacuum hose 55 which connects the space 54 to a vacuum source (not shown). The urging member 53 has a notch 53a formed at a portion of its annular urging surface (see FIGS. 12 and 13).

Further, the sealant charging apparatus includes a sealant-charging bore forming unit 61 for forming a sealant charging bore 8a in the inner liner 8, a buff unit 62 for buffing the periphery of the sealant charging bore 8a, and a sealant-charging bore closing unit 63 for closing the sealant charging bore 8a after charging of the sealant 7 through the sealant charging bore 8a into the sealant chamber 6.

Figure 8:
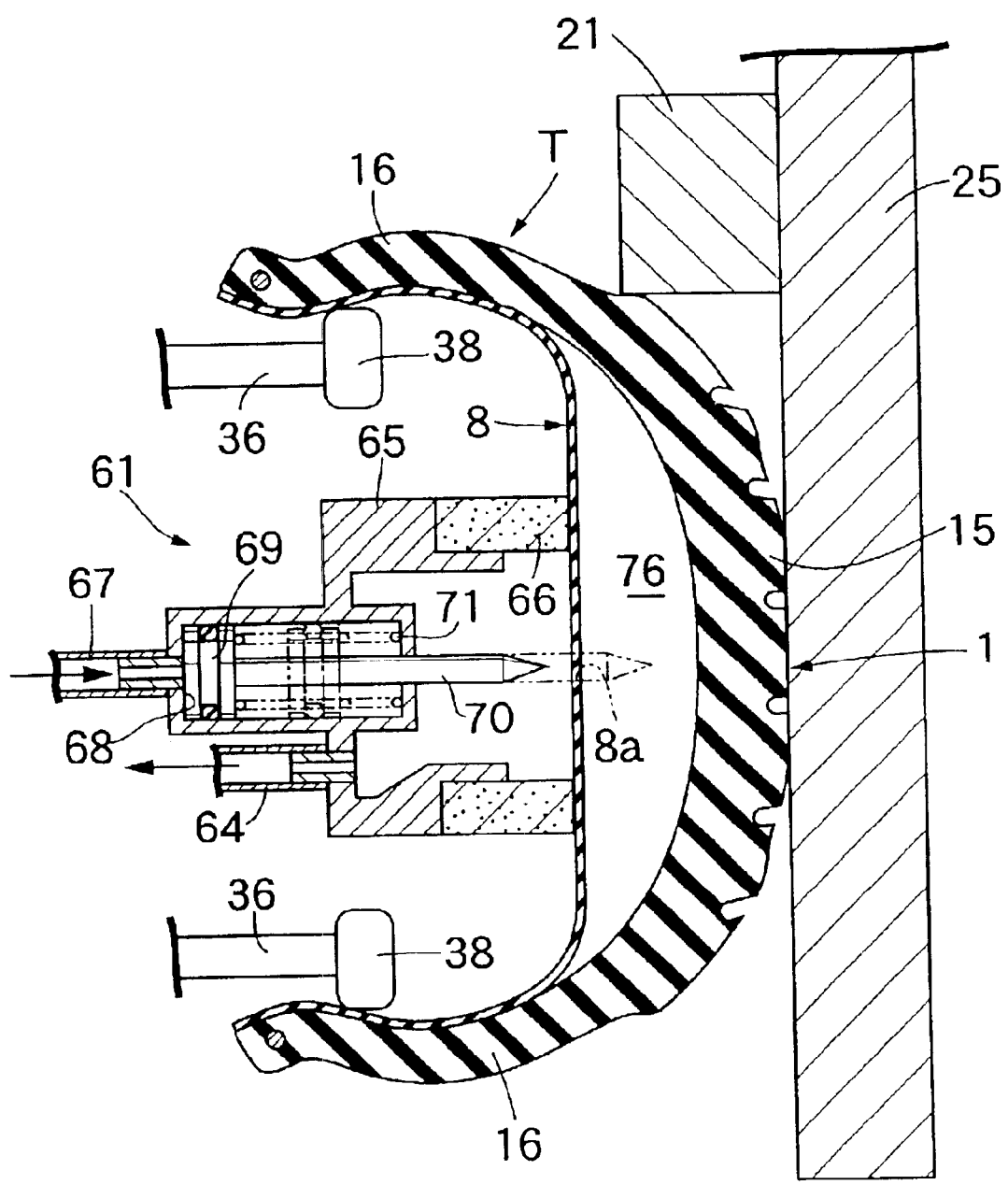

As shown in FIG. 8, the sealant-charging bore forming unit 61 includes a suction cup 65 connected to a vacuum source (not shown) through a vacuum hose 64, an annular seal pad 66 mounted to an outer periphery of the suction cup 65, a cylinder 68 integrally provided on a bottom wall of the suction cup 65 and connected to a pressure source (not shown) through a pressure hose 67, a piston 69 slidably received in the cylinder 68, an edge tool 70 integrally provided on the piston 69 for advancing and retracting movements, and a spring 71 accommodated within the cylinder 68 for biasing the piston 69 in a retracting direction. The sealant-charging bore forming unit 61 is connected to a drive unit (not shown) and is movable between a position where it is opposed to the inner liner 8 of the tire T, and a position where it is retracted therefrom.

Figure 15:
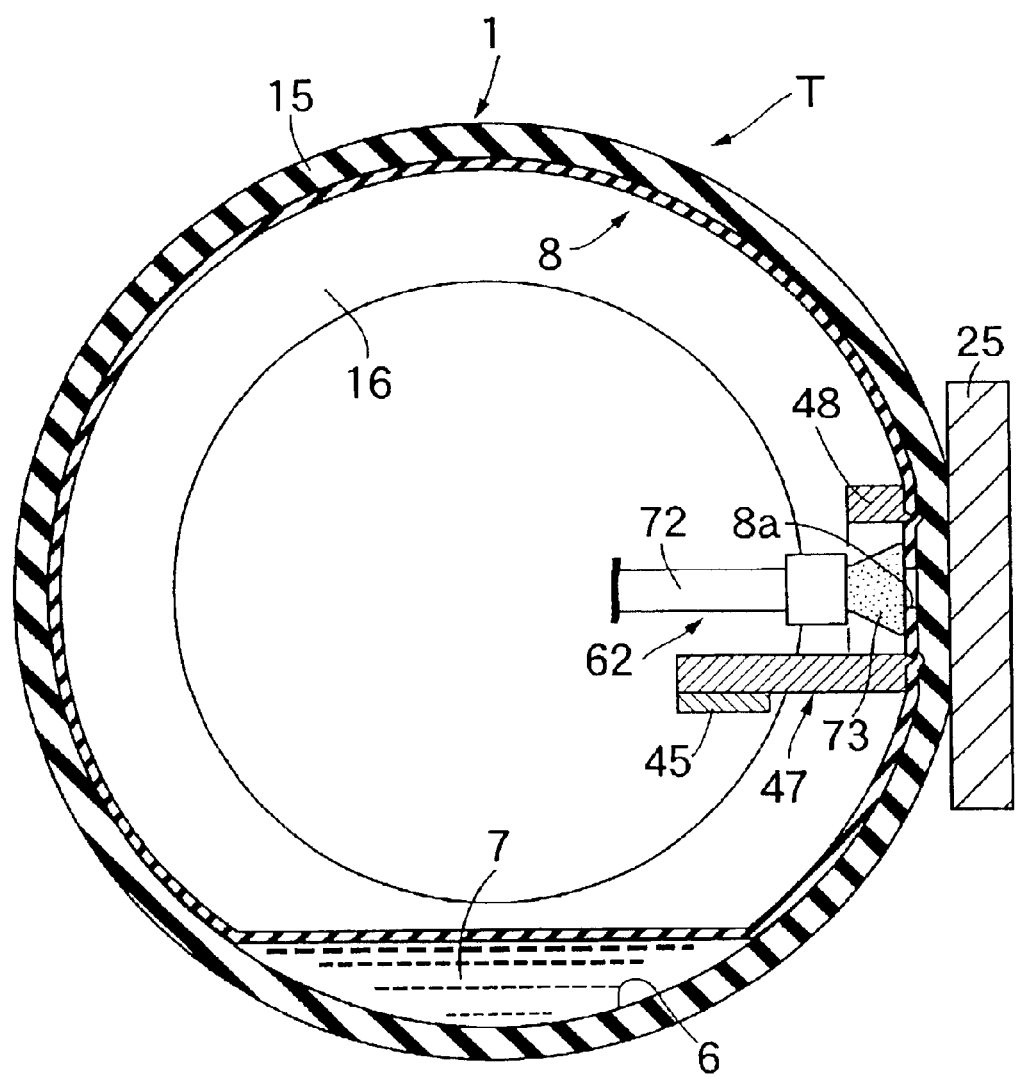

As shown in FIG. 15, the buff unit 62 includes a rotary shaft 72 connected to and rotated by a drive source (not shown), and a buff provided at a tip end of the rotary shaft 72. The buff unit 62 is movable between a position where it is opposed to the inner liner 8 of the tire T, and a position where it is retracted therefrom.

Figure 16:
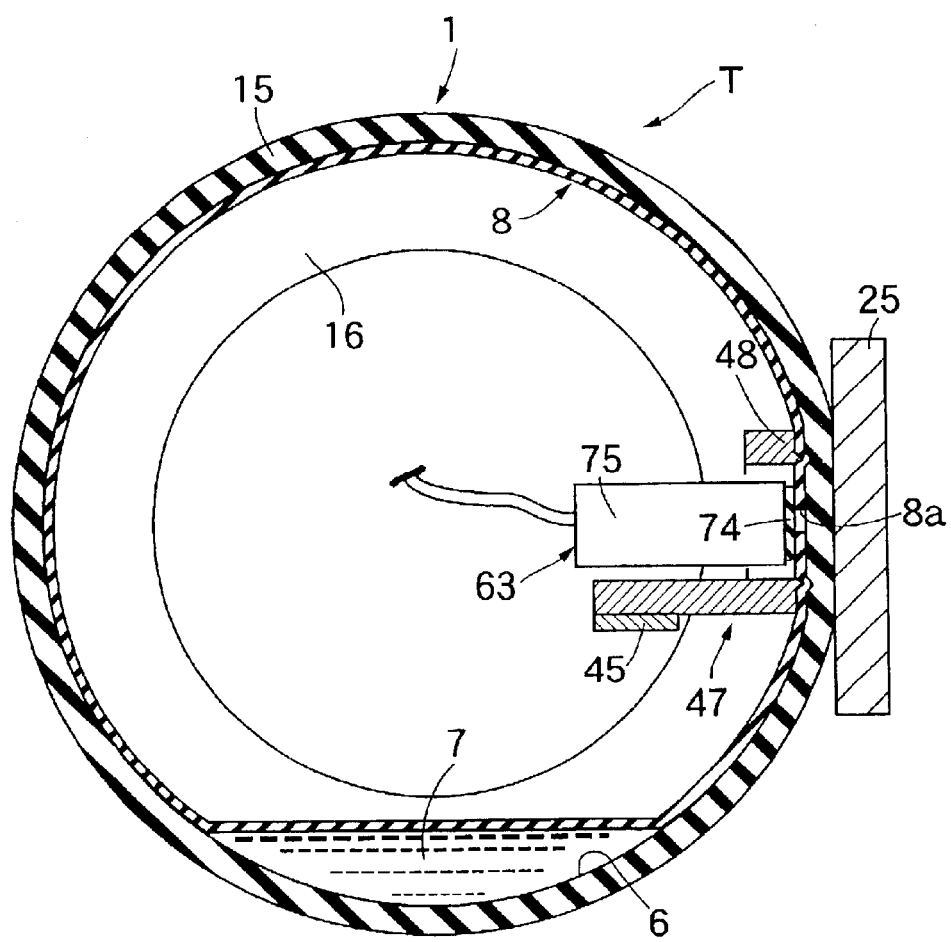

As shown in FIG. 16, the sealant-charging bore closing unit 63 includes an adhering device 75 operable to retain a crude rubber sheet 74 for closing the sealant charging bore 8a and heat the crude rubber sheet 74 to vulcanize and adhere the crude rubber sheet 74, and is movable between a position where it is opposed to the inner liner 8 of the tire T and a position where it is retracted therefrom.

The operation of the sealant charging apparatus will be described below.

First, as shown in FIGS. 1 and 2, the tire T is placed on the sealant charging apparatus with one side face thereof extending along the base frame 21, and is fixed by the bottom support plate 23, the side-supporting plates 24 and 25, the fixing and positioning roller 22 and the movable positioning roller 29. At this time, the rollers 38, 38 of the sidewall-spreading unit 31 is spaced apart from the tire T, and the clamp head 47 of the clamp unit 41 and the vacuum head 51 of the vacuum unit 42 are spaced apart from the tire T.

The two cylinders 34 and 37 of the sidewall-spreading unit 31 are driven from this state to move the pair of arms 36, 36, whereby inner surfaces of the sidewalls 16, 16 of the tire T in the vicinity of the one side-supporting plate 25 are urged and spread out by the rollers 38, 38 mounted at the tip ends of the arms 36, 36 (see FIG. 7).

Then, as shown in FIG. 8, the sealant-charging bore forming unit 61 is inserted between the spread-out sidewalls 16, 16 of the tire T through between the pair of rollers 38, 38, and air in the suction cup 65 is sucked through the vacuum hose 64, thereby attracting the inner liner 8 of the tire T by the annular seal pad 66 mounted on the suction cup 65. The inner liner 8 is vulcanized and adhered to the inner surfaces of the sidewalls 16, 16, but not adhered to the inner surface of the tread 15. Therefore, a portion of the inner liner 8 attracted to the seal pad 66 is spaced apart from the tread 15 to define a space 76.

When high-pressure air is supplied through the pressure hose 67 into the cylinder 68 in this state to advance the piston 69 from a position shown by a solid line to a position shown by a dashed line against a resilient force of the spring 71, a sealant-charging bore 8a is opened in the inner liner 8 by the edge tool 70 advanced in unison with the piston 69. At this time, a portion of the inner liner 8 around the sealant-charging bore 8a has been attracted and fixed to the seal pad 66 and hence, it is possible to inhibit the movement and the deformation of the inner liner 8 to smoothly conduct the perforation of the sealant-charging bore 8a by the edge tool 70, and also to enhance the perforating accuracy for the sealant-charging bore 8a.

Figure 9:
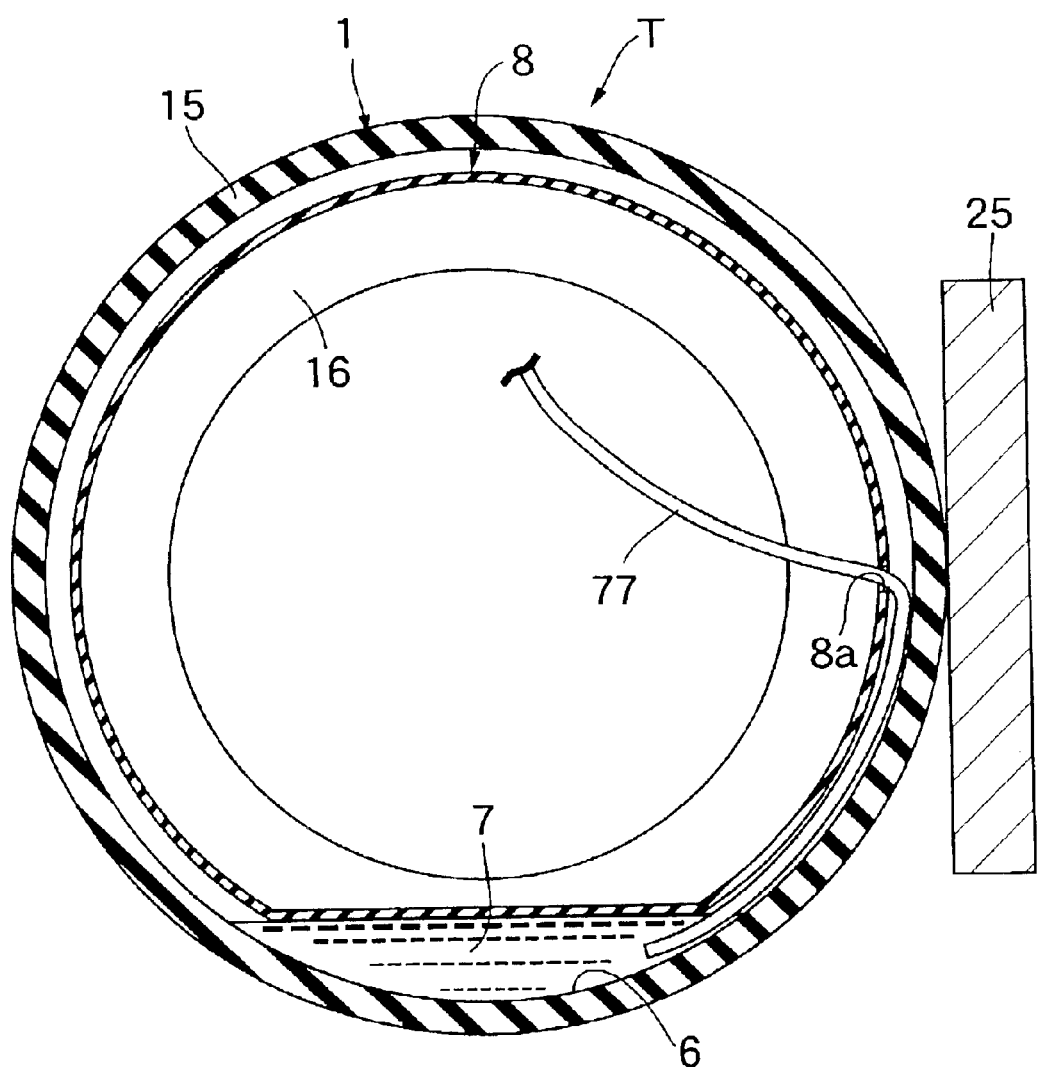

Subsequently, the sealant-charging bore forming unit 61 is retracted and then, as shown in FIG. 9, the sealant-charging hose 77 is inserted into the sealant-charging bore 8a in the inner liner 8 of the tire T to charge the sealant 7 into the sealant chamber 6. Thereafter, the sealant-charging hose 77 is withdrawn out of the sealant-charging bore 8a. The sealant chamber 6 is defined into a loop-shape along the inner surface of the tread 15 of the tire T, but the sealant 7 stays on the bottom of the tire T by gravitation. In this manner, the sealant 7 is charged through the sealant charging hose 77 and via the sealant charging bore 8a and hence, the time required for the charging of the sealant 7 can be shortened remarkably, as compared with a case where the sealant 7 is charged by a syringe.

Figure 4:
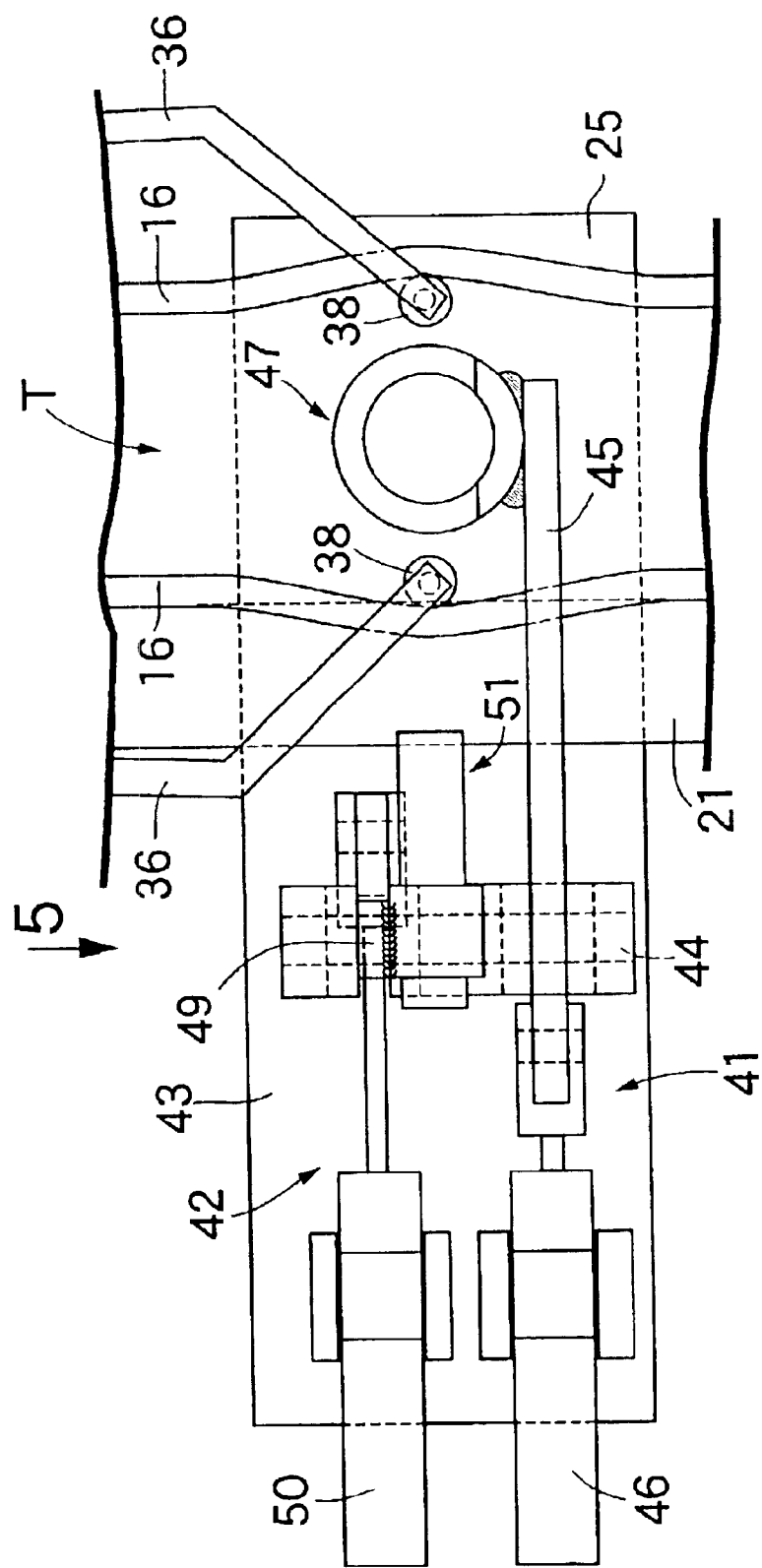
Figure 5:
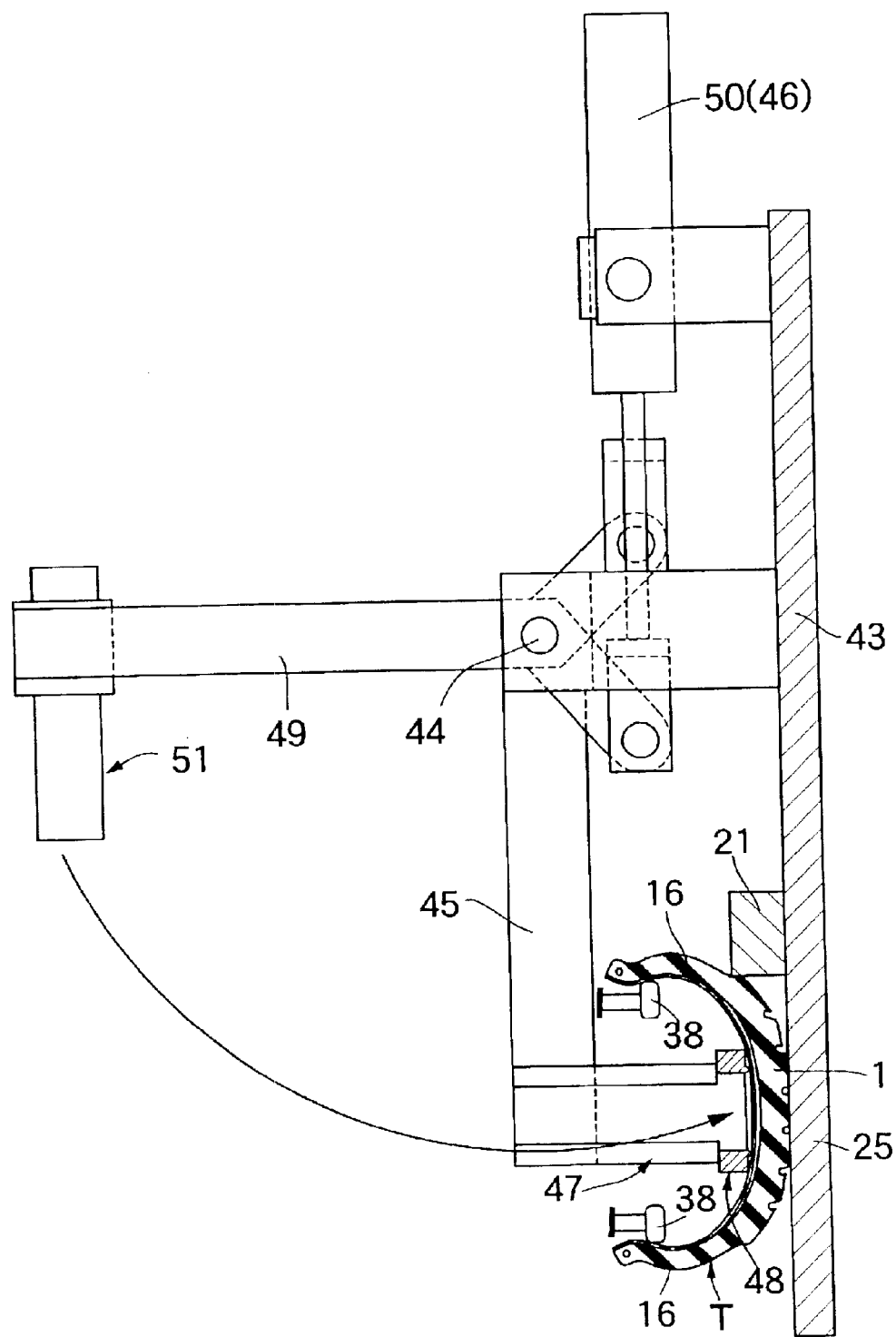
Figure 10:
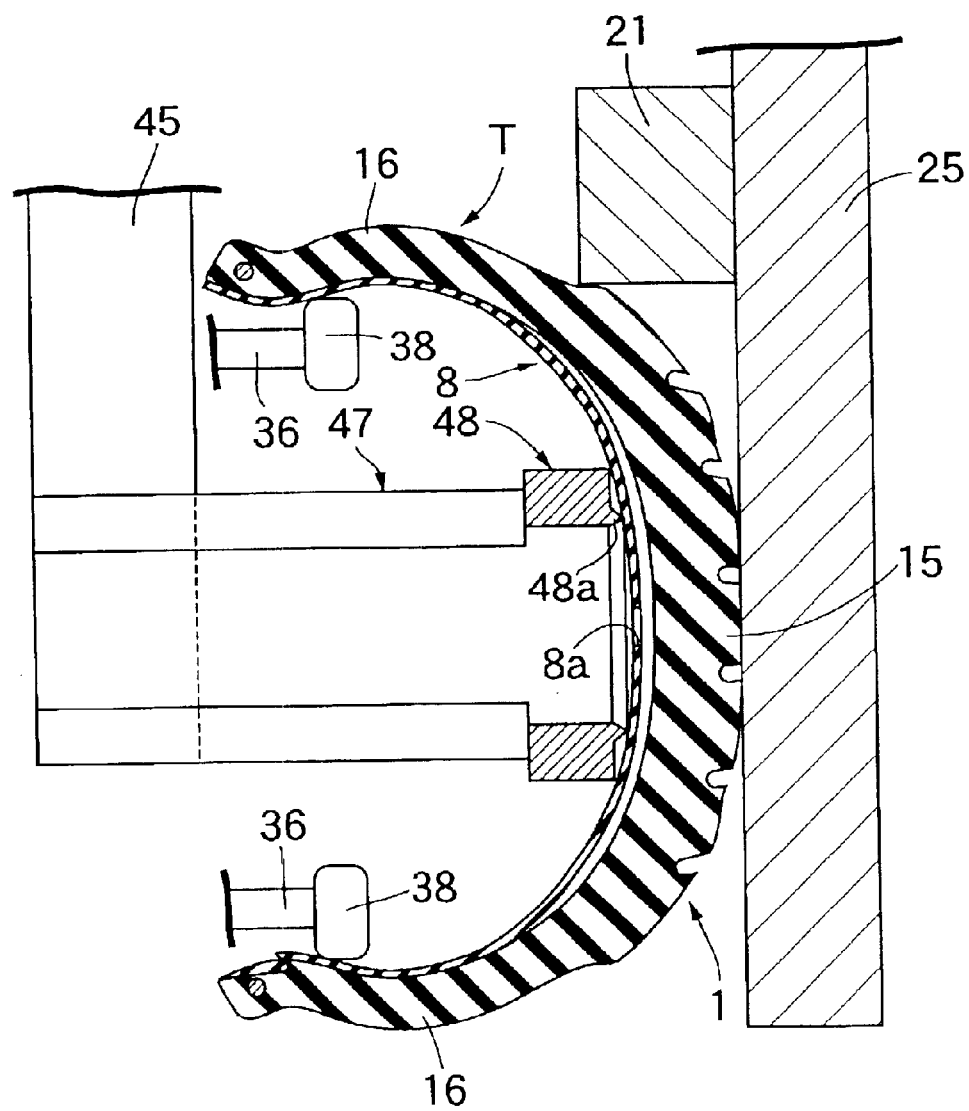

As shown in FIGS. 4 and 5, the cylinder 46 of the clamp unit 41 is contracted from this state to swing the arm 45 through approximately 90° about the pivot 44, thereby inserting the clamp head 47 provided at the tip end of the arm 45 between the spread-out sidewalls 16, 16. At this time, as shown in FIG. 10, the urging projection 48a of the clamp portion 48 provided on the clamp head 47 is only brought into contact with the inner surface of the inner liner 8, and the inner liner 8 cannot be urged against the inner surface of the tread 15.

Figure 6:
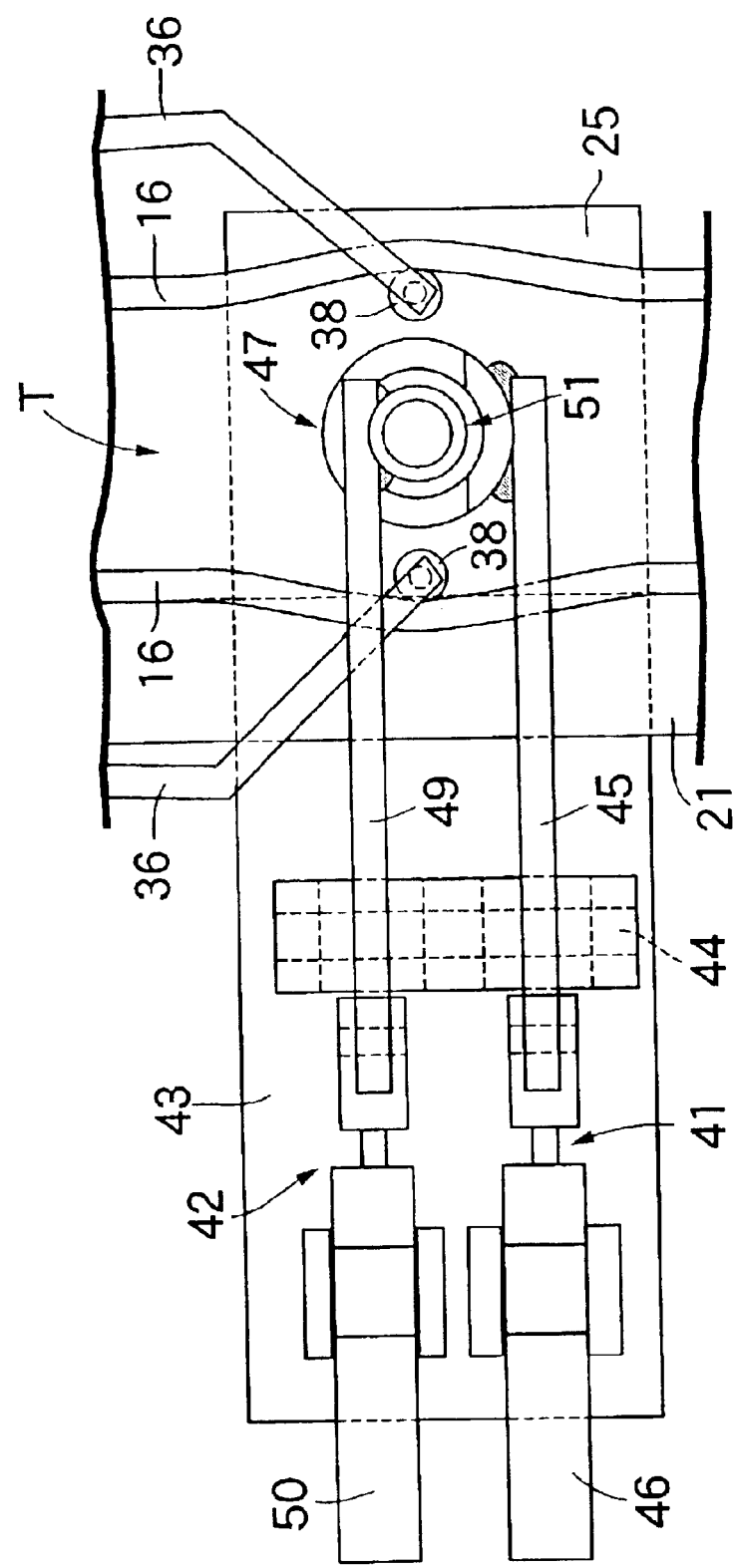
Figure 11:
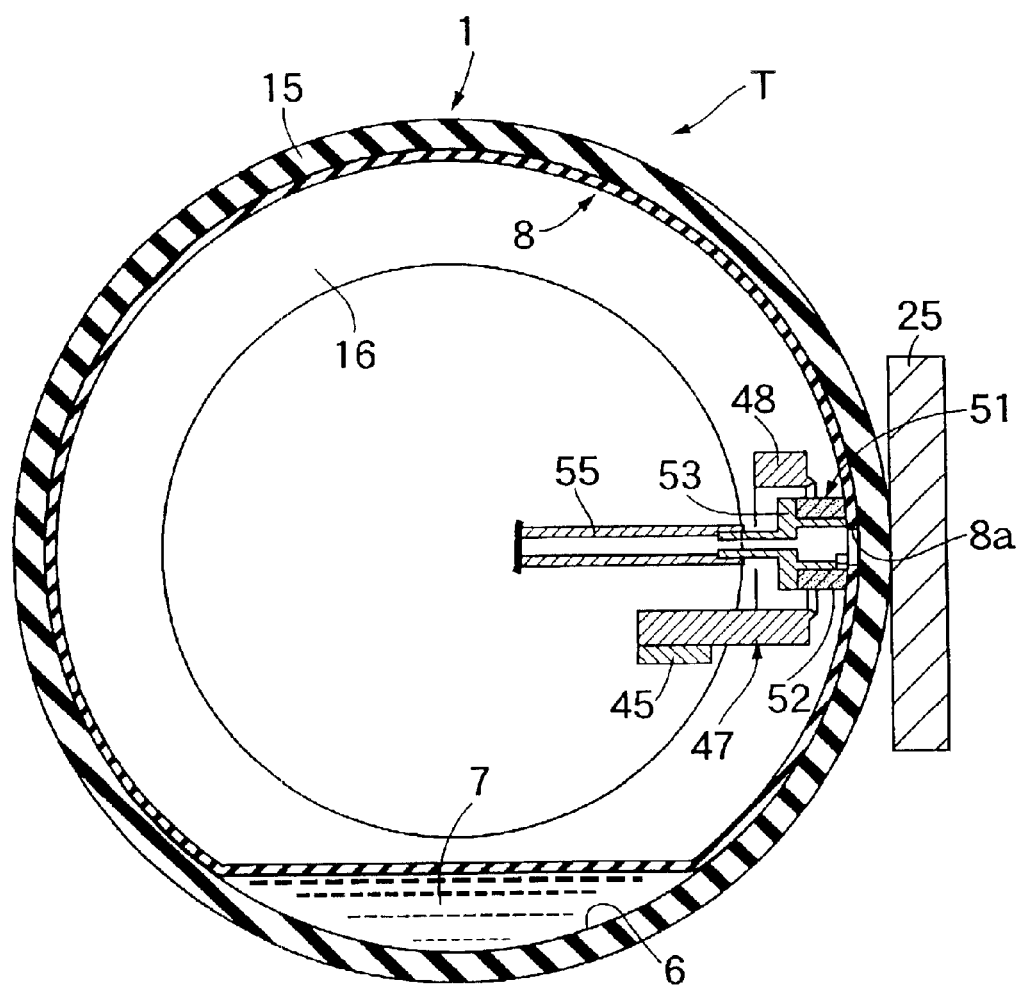

Then, as shown in FIG. 6, the cylinder 50 of the vacuum unit 42 is contracted to swing the arm 49 through approximately 90° about the pivot 44, thereby inserting the vacuum head 51 provided at the tip end of the arm 49 into the clamp head 47 to urge the urging member 53 and the seal pad 52 mounted on the vacuum head 51 against the inner surface of the inner liner 8 (see FIG. 11). As can be seen from FIGS. 12 and 13, when the urging member 53 is urged against the inner surface of the inner liner 8, an urging force is not applied to a portion of the inner liner 8 opposed to the notch 53a of the urging member 53 and hence, the inner liner 8 can be spaced apart from the inner surface of the tread 15 at a location corresponding to the notch 53a.

Figure 12:
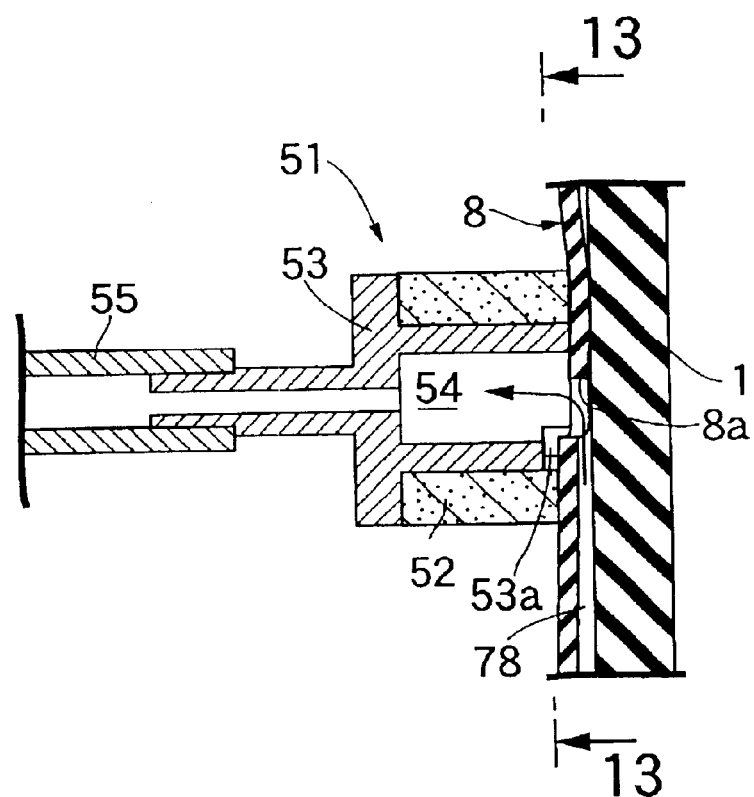
Figure 13:
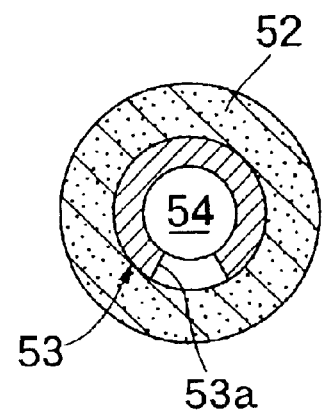

When the space 54 within the urging member 53 is drawn through the vacuum hose 55 from this state, the inner liner 8 is attracted to come into close contact with the seal pad 66, but a portion of the seal pad 66 is forced to be contracted at a location corresponding to the notch 53a, whereby a portion of the inner liner 8 in the vicinity of the sealant-charging bore 8a is spaced apart from the inner surface of the tread 15 to define a clearance 78 (see FIG. 12). Therefore, the air flowing into the sealant chamber 6 upon the charging of the sealant 7 is drawn through the clearance 78 and the space 54 in the urging member 53 by the suction provided through the vacuum hose 55 and thus discharged out of the sealant chamber 6. At this time, the periphery of the sealant charging bore 8a is in close contact with the seal pad 66 and hence, there is not a possibility of occurrence of the leakage of the air.

Figure 14:
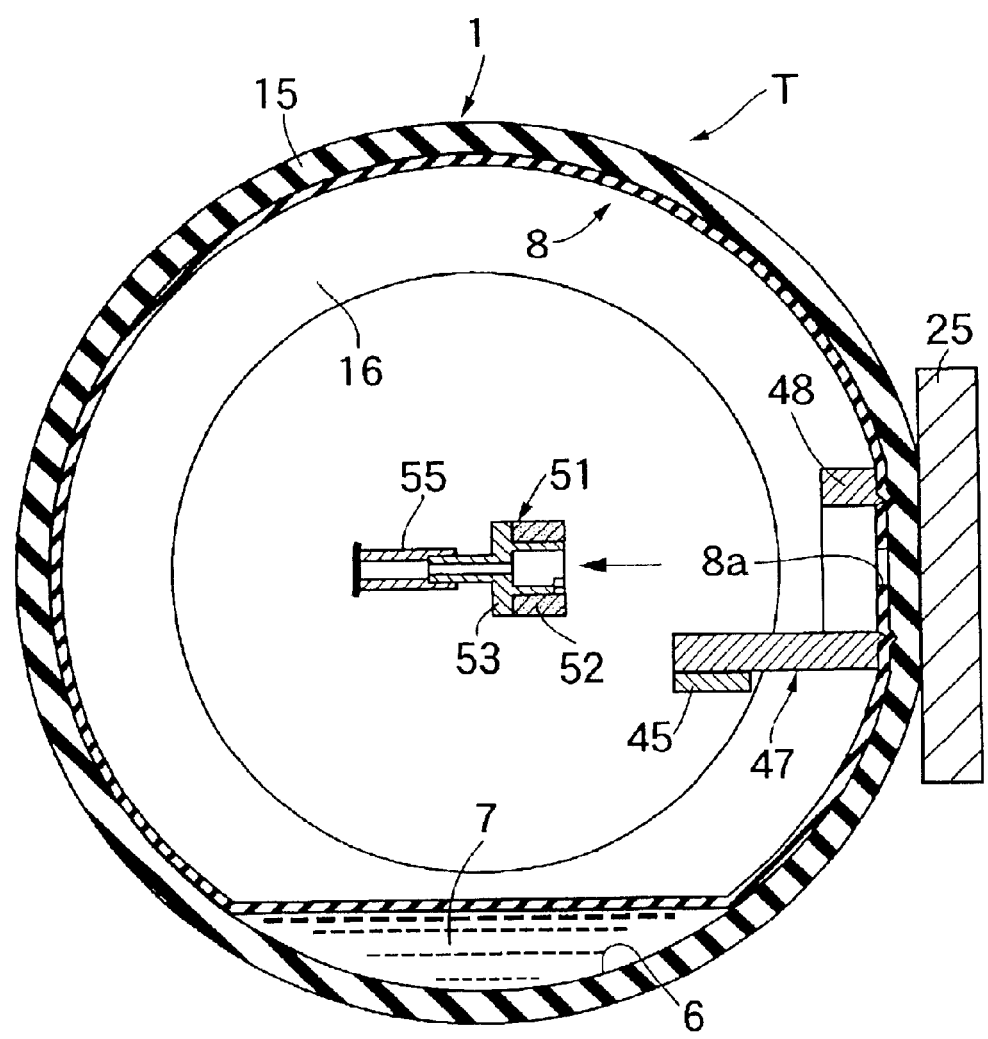

Then, as shown in FIG. 14, the clamp head 47 of the clamp unit 41 is advanced, and the urging projection 48a of the clamp portion 48 is urged to bite into the inner surface of the inner liner 8, thereby bringing the inner liner 8 into close contact with the inner surface of the tread 15 to seal the outer periphery of the seal charging bore 8a, so that the air is prevented from entering the sealant chamber 6. Thereafter, the vacuum head 51 of the vacuum unit 42 is retracted. By finishing the suction provided by the vacuum unit 42 after clamping of the periphery of the sealant charging bore 8a by the clamp unit 41, it is possible to reliably prevent the air from entering again through the sealant charging bore 8a into the sealant chamber 6, and to enhance the sealing effect of the sealant 7 upon the puncture of the tire.

Figure 17:
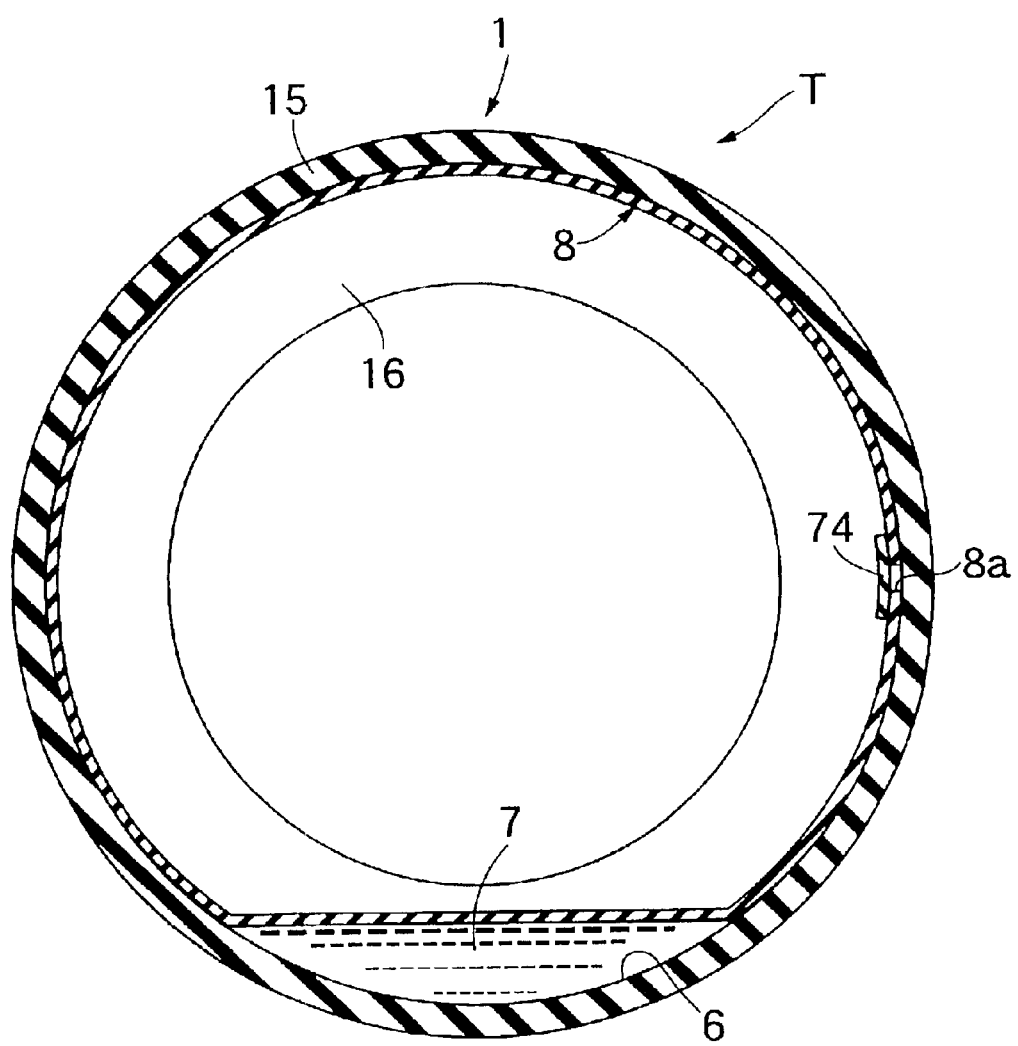

Subsequently, as shown in FIG. 15, the buff unit 62 is advanced to abrade the periphery of the sealant charging bore 8a by the buff 73 which is being rotated. Then, as shown in FIG. 16, the sealant charging bore closing unit 63 is advanced to vulcanize and adhere the crude rubber sheet 74 to the periphery of the sealant charging bore 8a by the adhering unit 75, thereby completing the tire T, as shown in FIG. 17. The adhesive strength of the crude rubber sheet 74 can be enhanced sufficiently by abrading the periphery of the sealant charging bore 8a in the above-described manner. Moreover, the abrasion is carried out by the buff 73 in a state in which the periphery of the sealant charging bore 8a has been clamped by the clamp head 47 and hence, it is possible to reliably prevent the inner liner 8 to be deformed and damaged by a frictional force received from the buff 73.

As described above, the inner liner 8 is previously adhered to the tire body 1 to complete the tire T having the sealant chamber 6 and then, the sealant 7 is charged into the sealant chamber 6. Therefore, heat for vulcanizing and forming the tire T is not applied to the sealant 7 and hence, it is possible to prevent the deterioration of the sealant 7 due to the heat to ensure a sealing effect.

Figure 18:
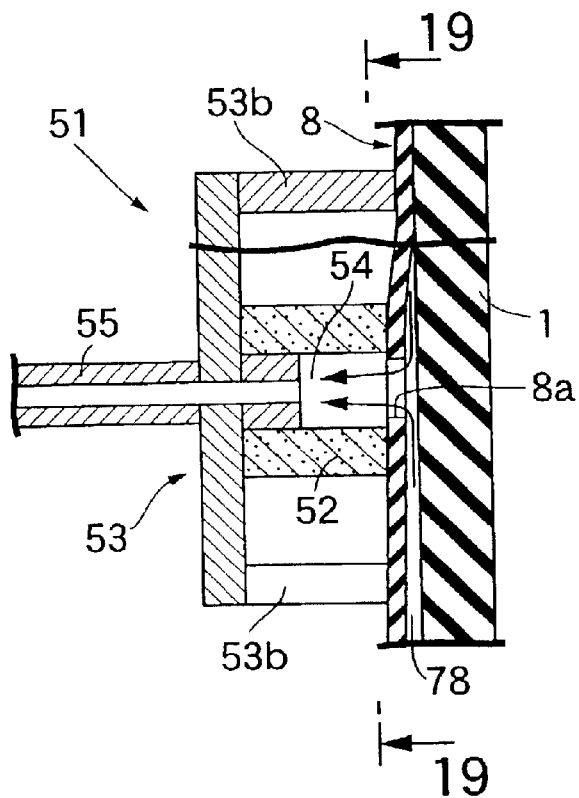
FIGS. 18 and 19 show a second embodiment of the present invention.
Figure 19:
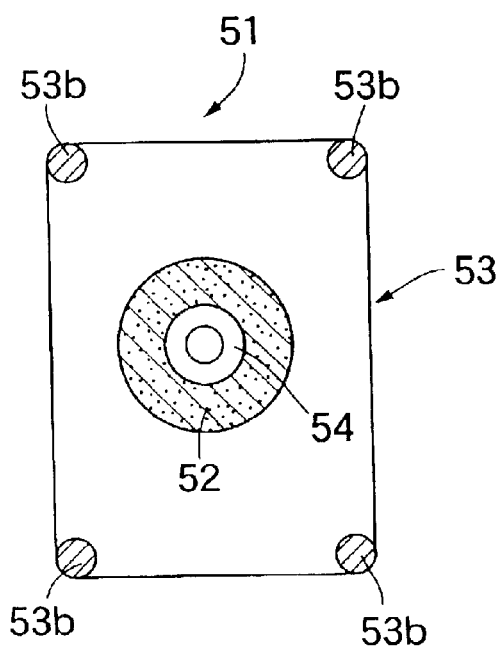

A vacuum unit 42 in a second embodiment of the present invention will be described below with reference to FIGS. 18 and 19.

The vacuum unit 42 in the second embodiment includes an urging member 53 formed into a rectangular plate shape. A cylindrical seal pad 66 is mounted at a central portion of the urging member 53, and four urging projections 53b are provided to protrude from four corners of the urging member 53 so as to surround the periphery of the seal pad 66, and are capable of abutting against the inner surface of the inner liner 8. When a space 54 within the seal pad 66 is drawn in a state in which the inner surface of the inner liner 8 has been urged by the four urging projections 53b, the inner liner 8 is attracted to come into close contact with the seal pad 66, and a portion of the inner liner 8 is spaced apart from the inner surface of the tread 15 at locations between the four urging projections 53b to define clearances 78. Therefore, air flowing into the sealant chamber 6 upon charging of the sealant 7 is drawn through the clearances 78 and the space 54 within the seal pad 66 by the suction provided through the vacuum hose 55 and thus discharged out of the sealant chamber 6.

A process of charging the sealant 7 according to a third embodiment of the present invention will be described below with reference to FIGS. 20 and 21.

In the process of charging the sealant 7 according to the third embodiment, the first step to the abrading step using the buff 73 (see FIG. 15) are the same as those in each of the first and second embodiments, but the step of closing the sealant charging bore 8a is different from that in each of the first and second embodiments.

Figure 20:
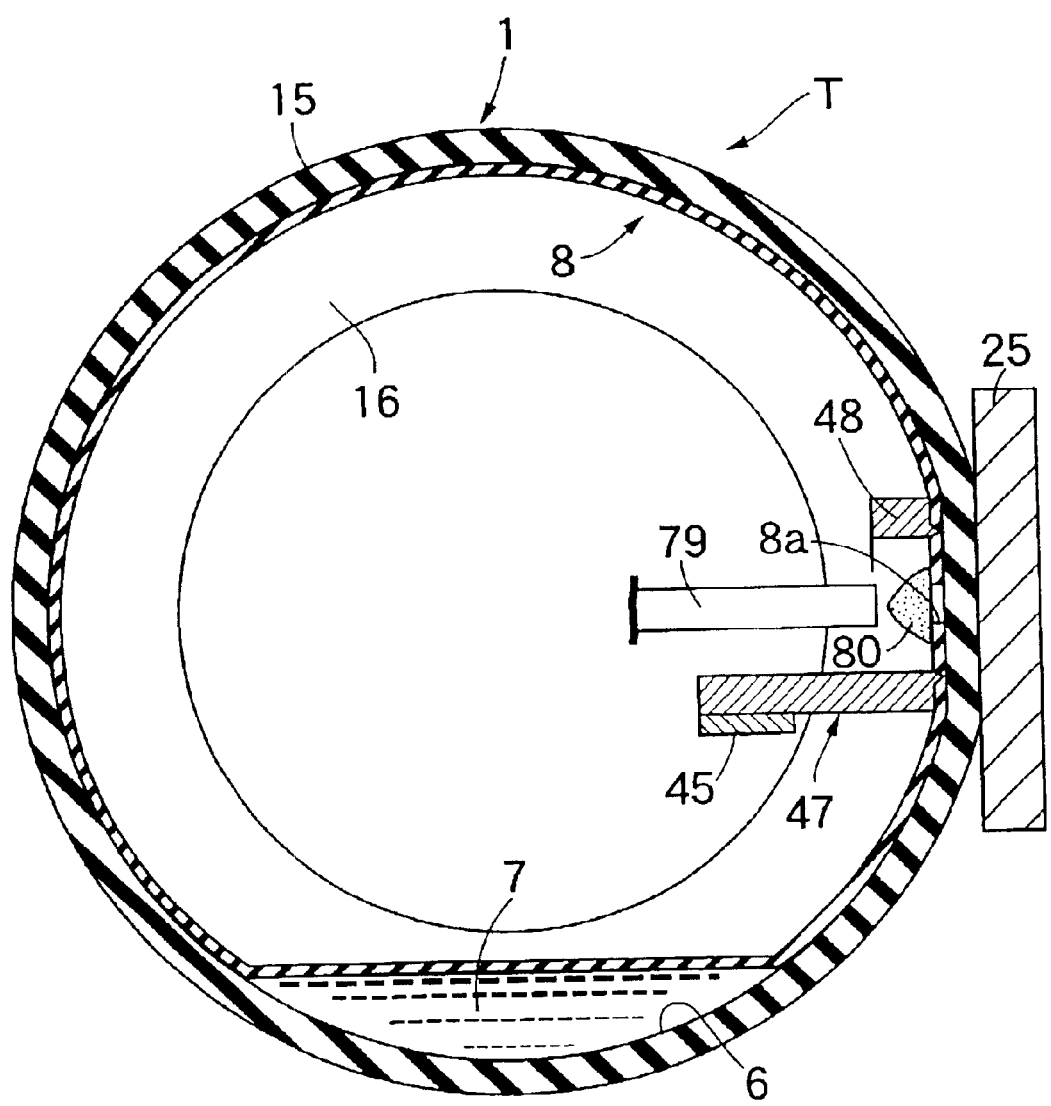
FIGS. 20 and 21 show a third embodiment of the present invention.
Figure 21:
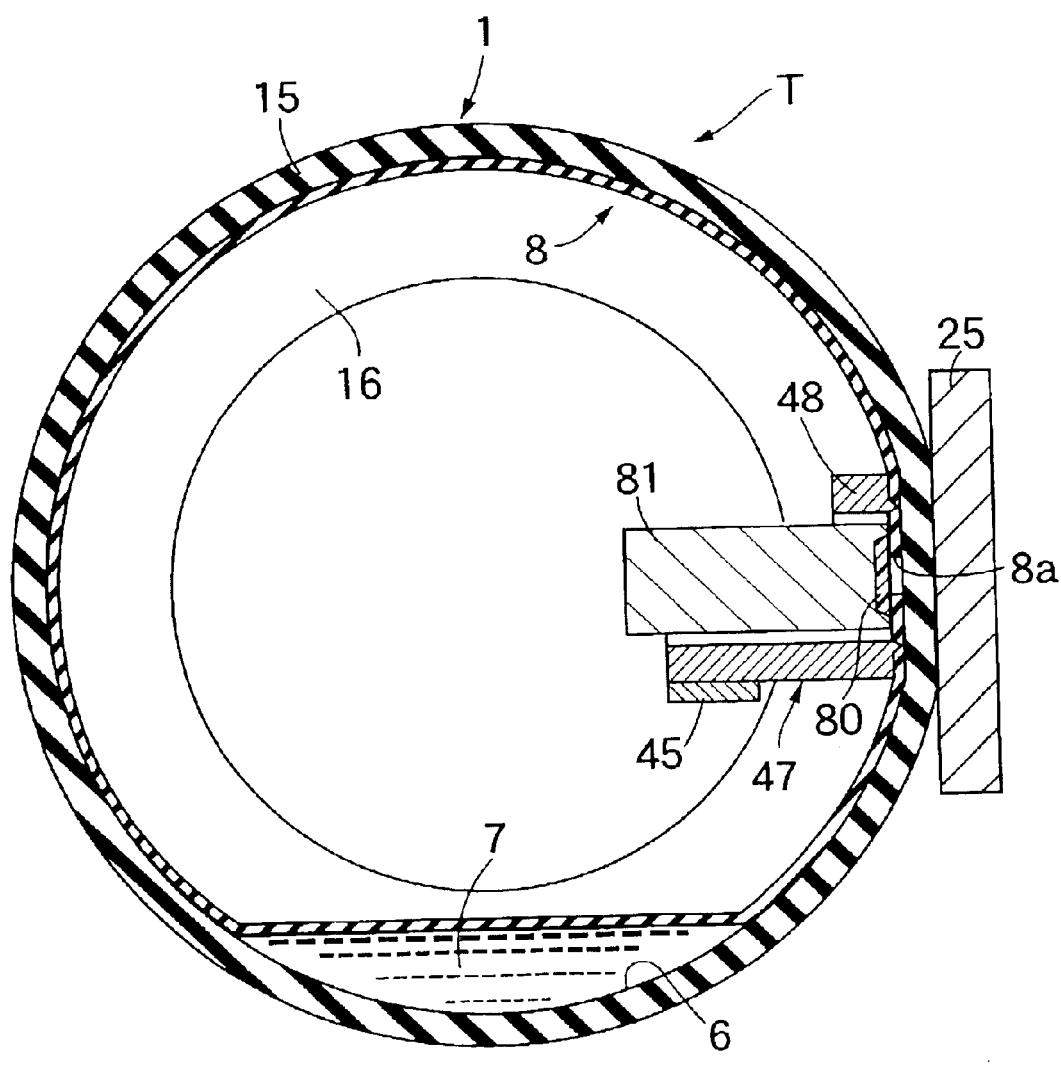

More specifically, an acrylic or urethane-based thermosetting resin 80 is supplied as a sealer from a sealer supply nozzle 79 to the periphery of the sealant charging bore 8a abraded by the buff 73 (see FIG. 20). After retraction of the sealer supply nozzle 79, the thermosetting resin 80 is then heated for 15 to 30 seconds and formed into a predetermined shape by a forming die 81 heated to approximately 180° (see FIG. 21). When the thermosetting resin 80 is cooled and cured, the sealant charging bore 8a is closed, and in this manner, a sealant-incorporated tire T is completed. During the step of closing the sealant charging bore 8a, the clamp portion 48 is clamping the periphery of the sealant charging bore 8a so as to surround it.

A process of charging the sealant 7 according to a fourth embodiment of the present invention will be described below with reference to FIGS. 22 and 23.

Even in the process of charging the sealant 7 according to the fourth embodiment, the first step to the abrading step using the buff 73 are the same as those in each of the first and second embodiments (see FIG. 15), but the step of closing the sealant charging bore 8a is different from that in each of the first and second embodiments, as is in the third embodiment.

Figure 22:
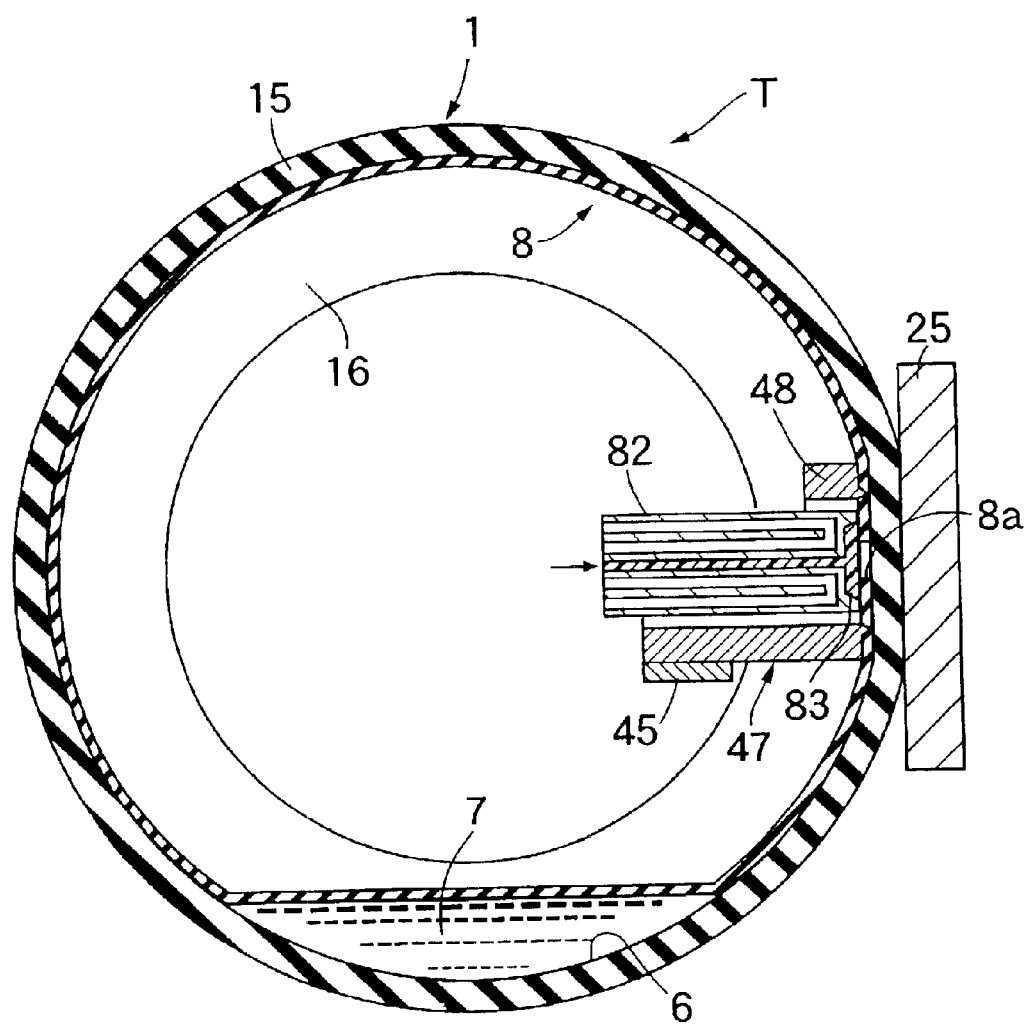
FIGS. 22 and 23 show a fourth embodiment of the present invention.
Figure 23:
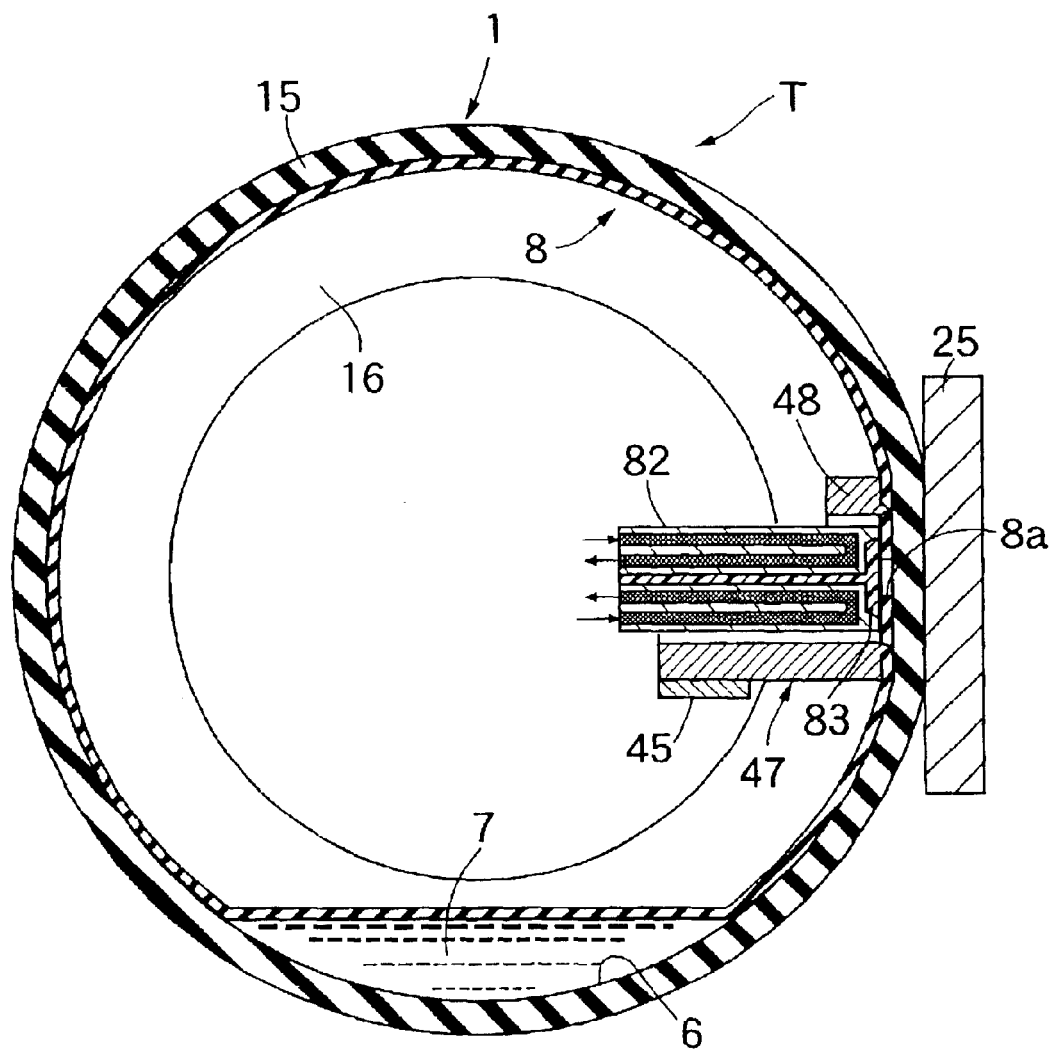

More specifically, a forming die 82 is put into abutment against the periphery of the sealant charging bore 8a abraded by the buff 73, and a molten hot-melt resin 83 is injected through the inside of the forming die 82 (see FIG. 22). Subsequently, cooling water is allowed to flow through the inside of the forming die 82 to cool and solidify the hot-melt resin 83, thereby closing the sealant charging bore 8a by the solidified hot-melt resin 83 to complete the tire T (see FIG. 23). During the step of closing the sealant charging bore 8a, the clamp portion 48 is clamping the periphery of the sealant charging bore 8a so as to surround it.

As described above, according to each of the third and fourth embodiments, the sealant charging bore 8a is closed by the thermosetting resin 80 or the hot-melt resin 83 in a state in which the periphery of the sealant charging bore 8a has been clamped by the clamp portion 48. Therefore, it is possible to prevent air from entering again through the sealant charging bore 8a into the sealant chamber 6 which once depleted air and moreover, it is possible to close the sealant charging bore 8a in a short time, as compared with a case where the crude rubber sheet 74 is adhered to the sealant charging bore 8a. In addition, it is possible to enhance the closing strength provided by the thermosetting resin 80 or the hot-melt resin 83 by previously buffing the periphery of the sealant charging bore 8a.

A fifth embodiment of the present invention will be described below with reference to FIG. 24.

Figure 24:
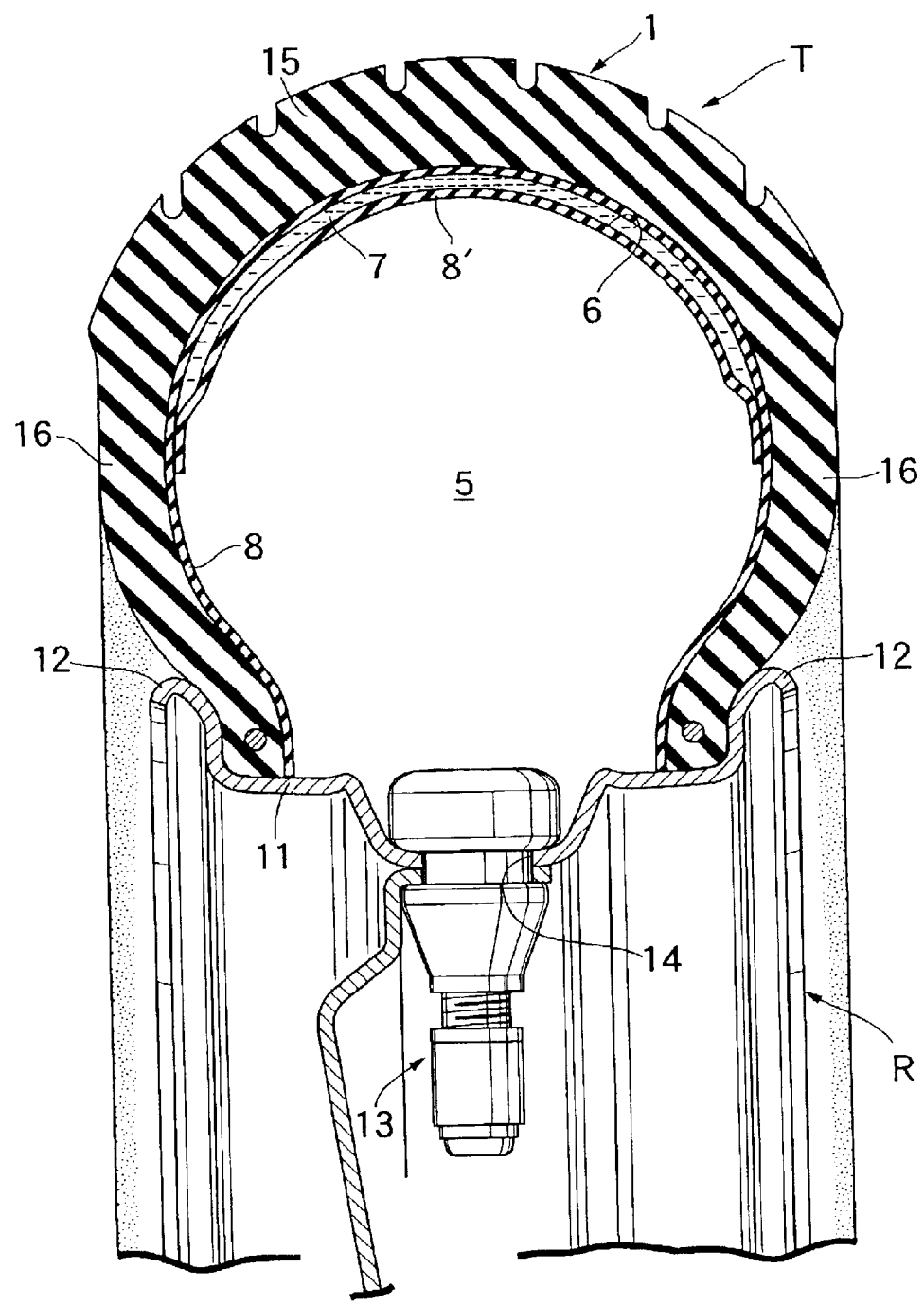
FIG. 24 is a cross-sectional view of a wheel provided with a tire according to a fifth embodiment of the present invention.

In each of the above-described embodiment, the sealant chamber 6 has been defined between the inner surface of the tire body 1 and the inner liner 8, but a sealant chamber 6 may be defined between two inner liners 8 and 8', as indicated in the fifth embodiment shown in FIG. 24. More specifically, a first Inner liner 8 is adhered to the entire inner surface of the tire body 1, and a second inner liner 8' is adhered at its opposite ends to an inner surface of the first inner liner 8, whereby the sealant chamber 6 can be defined between the first and second inner liners 8 and 8'. Even according to this embodiment, the sealant 7 can be charged into the sealant chamber 6 through a sealant charging bore 8a made in the second inner liner 8'.

In the fifth embodiment, the first and second inner liners 8 and 8' may be formed integrally with each other from a single member, in place of being bonded each other by adhering.

A sixth embodiment of the present invention will be described below with reference to FIGS. 25 to 27G.

Figure 25:
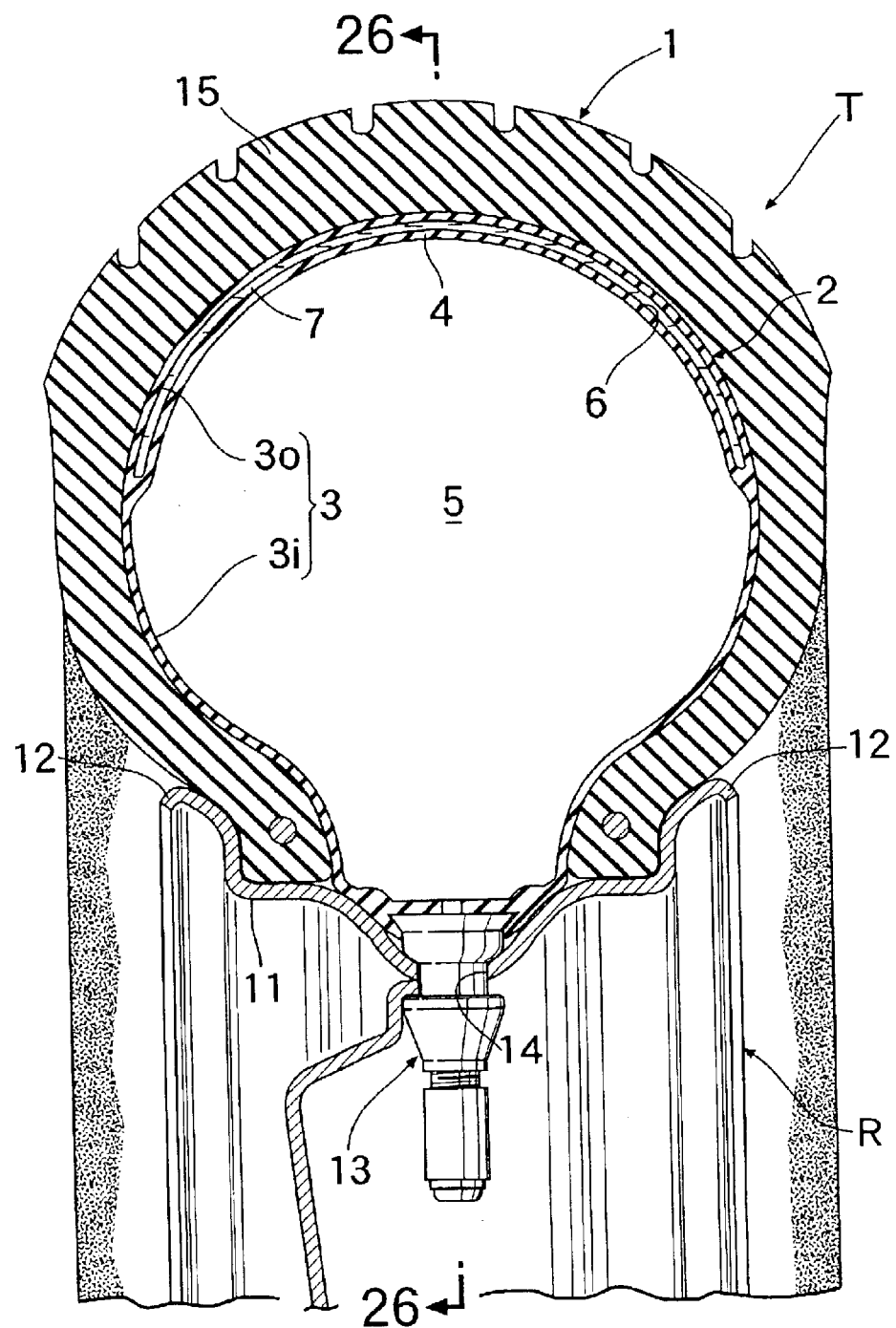
Figure 26:
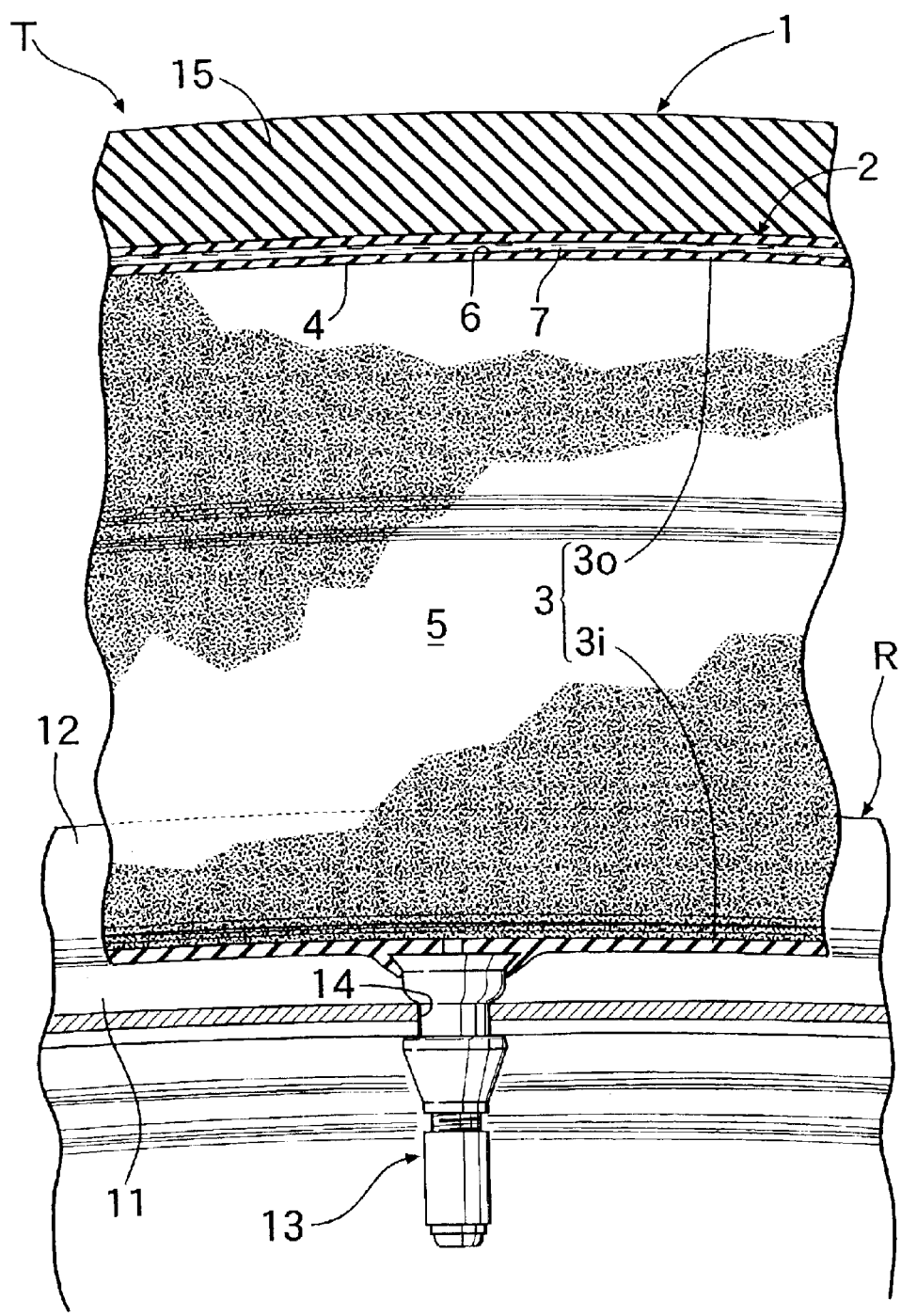

As shown in FIGS. 25 and 26, a tube-incorporated tire T comprising a tire body 1 and a tire tube 2 accommodated in the tire body 1 is mounted on a rim R of a wheel of a motorcycle. The tire tube 2 includes a peripheral wall 3, which is formed into an annular shape in section and which includes an air chamber peripheral wall portion 3i located at a radially inner side of the tire T, and a sealant chamber peripheral wall portion 3o located at a radially outer side of the tire T. Connections of the air chamber peripheral wall portion 3i and the sealant chamber peripheral wall portion 3o in the peripheral wall 3 are connected to each other by a partition wall 4 formed integrally with them. Air is charged into an air chamber 5 which is substantially circular in section and which is defined between the air chamber peripheral wall portion 3i and the partition wall 4, and a gelled sealant 7 is charged into a sealant chamber 6 which is substantially arcuate in section and which is defined between the sealant chamber peripheral wall portion 3o and the partition wall 4.

The rim R includes an annular rim body 11 extending in a circumferential direction of the tire T, and a pair of flange portions 12, 12 extending radially outwards from widthwise opposite ends of the rim body 11 to retain an inner periphery of the tire body 1. A pneumatic valve 13 for charging air into an air chamber 5 defined in the tire tube 2 is supported through a pneumatic valve-mounting portion 14 formed at a circumferentially one point on the rim body 11.

The sealant chamber 6 in the tire tube 2 is maintained in a shape extending along the inner side of the tread 15 by an air pressure in the air chamber 5. Therefore, even if the tire tube 2 is punctured radially or sideways by a nail or the like, the sealant 7 fills the puncture immediately to repair the puncture, thereby retarding the leakage of the air from the air chamber 5. The sealant 7 is retained in the sealant chamber 6 and cannot issue out into the air chamber 5 and hence, the pneumatic valve 13, a pressure gauge applied to the pneumatic valve 13 or the like cannot be clogged.

Figure 27A:
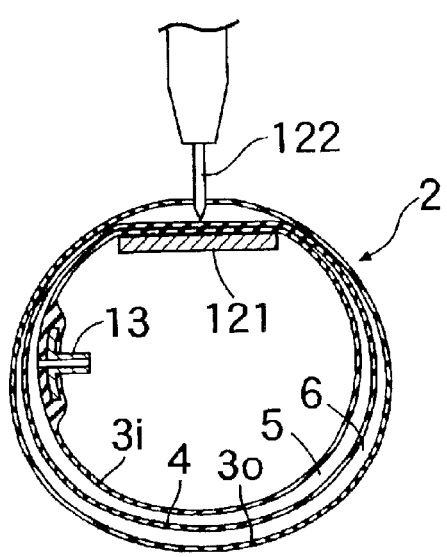
Figure 27B:
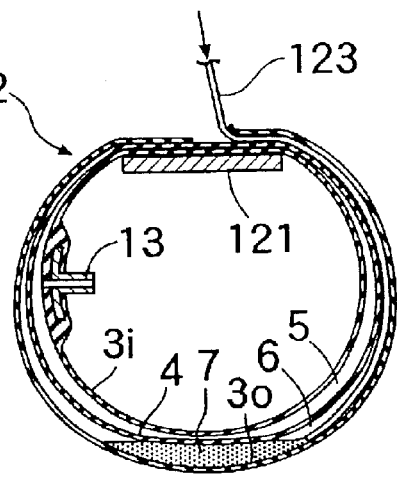

A step of charging the sealant 7 into the sealant chamber 6 in the tire tube 2 will be described with reference to FIGS. 27A and 27G.

First, the tire tube 2, into which the sealant 7 is still not charged, is placed so that its inner peripheral surface (the air chamber peripheral wall portion 3$i$) is supported on an upper surface of a support plate 121 disposed horizontally. Then, a hot nail 122 heated to about 400° C. by an electric heater is dropped toward the support plate 121 from the above to make a sealant charging bore 2$a$ in an outer peripheral surface (the sealant chamber peripheral wall portion 3$o$) of the tire tube 2. By using the hot nail 122 heated in the above manner, the sealant charging bore 2$a$ can be simply and reliably formed in the tire tube 2 made of a rubber (see FIG. 27A). After the hot nail 122 is retracted upwards, a sealant injecting hose 123 is inserted through the sealant charging bore 2$a$ into the sealant chamber 6, until it reaches the bottom of the sealant chamber 6, and the sealant 7 Is injected through the sealant injecting hose 123 via the sealant charging bore 2$a$ into the bottom of the sealant chamber 6. When the sealant injecting hose 123 is withdrawn, the sealant 7 stays on the bottom of the sealant chamber 6 by gravitation, and the air remains in the upper portion of the sealant chamber 6 (see FIG. 27B).

Figure 27C:
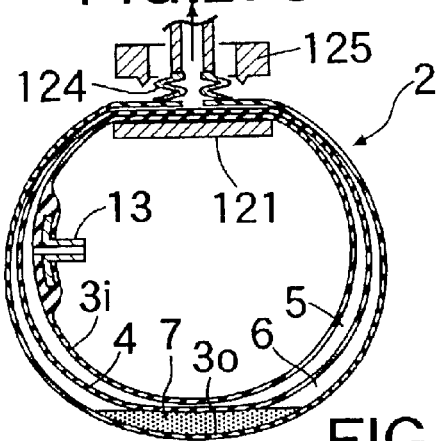
Figure 27D:
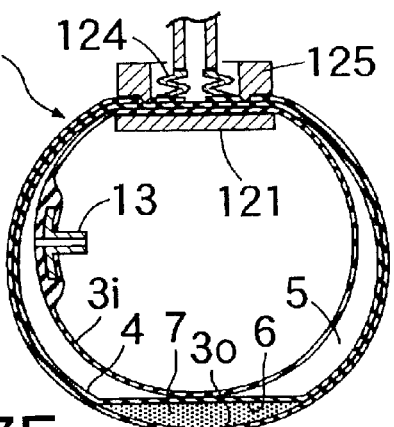

Then, a vacuum pad 124 connected to a vacuum source (not shown) is lowered and attracted to the periphery of the sealant charging bore 2$a$ to suck the air remaining in the sealant chamber 6 (see FIG. 27C). Subsequently, an annular clamp member 125 surrounding an outer periphery of the vacuum pad 124 is lowered, so that its lower surface is pressed against the tire tube 2 to surround the periphery of the sealant charging bore 2$a$, whereby the air chamber peripheral wall portion 3$i$, the partition wall 4 and the sealant chamber peripheral wall portion 3$o$ of the tire tube 2 are clamped trebly between the clamp member 125 and the support plate 121 (see FIG. 27D). At this time, the partition wall 4 and the sealant chamber peripheral wall portion 3$o$, excluding the section with sealant 7 charged thereto, are brought into close contact with each other, because the air in the sealant chamber 6 has been discharged by the suction provided by the vacuum pad 124 at the previous step. When the vacuum pad 124 is retracted upwards from this state, there is not a possibility that the air might enter through the sealant charging bore 2$a$ into the sealant chamber 6, because the clamp member 125 is clamping the periphery of the sealant charging bore 2$a$ so as to surround it.

Figure 27E:
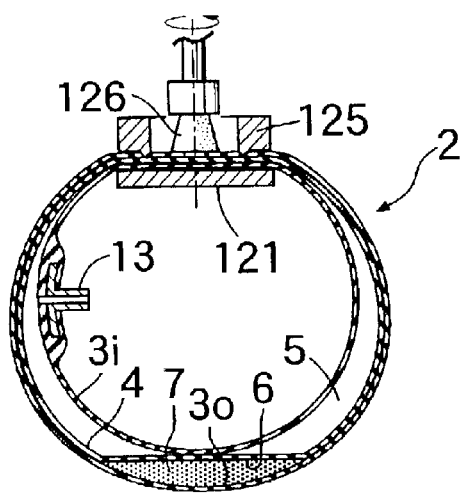

Then, the periphery of the sealant charging bore 2$a$ surrounded by the clamp member 125 is abraded by a buff 126, while maintaining the clamping by the clamp member 125, thereby removing oil and a stain deposited on the periphery of the sealant charging bore 2$a$ (see FIG. 27E). At this time, a load is applied to the periphery of the sealant charging bore 2$a$ by the buff 126 which is being rotated, but it is possible to reliably prevent the tire tube 2 from being deformed and damaged by a frictional force received from the buff 126, because such periphery is non-movably clamped by the clamp member 125.

Figure 27F:
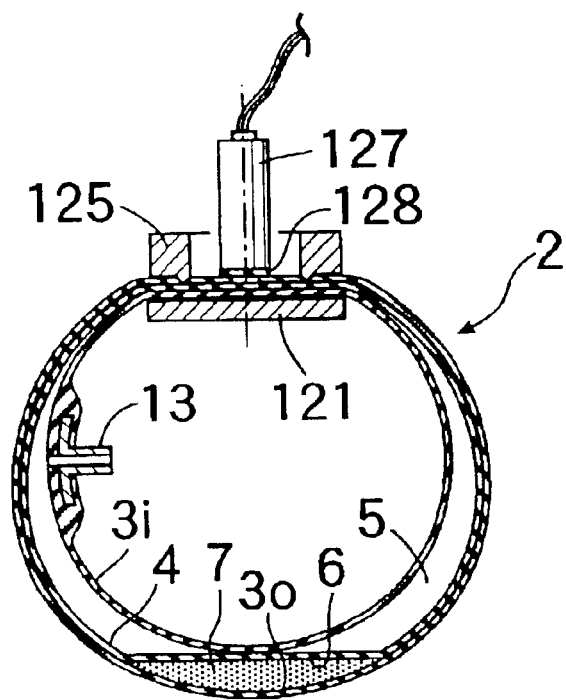
Figure 27G:
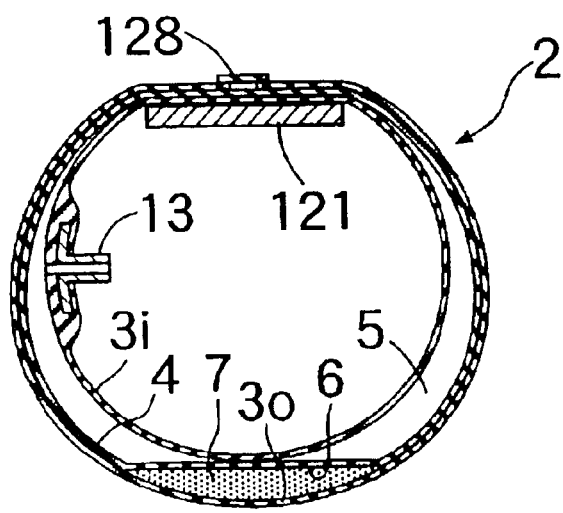

Subsequently, a crude rubber sheet 128 is put into abutment against the periphery of the sealant charging bore 2$a$ and heated by a crude rubber sheet adhering device 127, whereby it is vulcanized and adhered to close the sealant charging bore 2$a$ (see FIG. 27F). In this manner, the crude rubber sheet 128 is vulcanized and adhered with the periphery of the sealant charging bore 2$a$ clamped so as to be surrounded by the clamp member 125 and hence, it is possible to reliably prevent the adhered position from being displaced to ensure the adhesive quality. In addition, the crude rubber sheet 128 is vulcanized and adhered after abrasion of the periphery of the sealant charging bore 2$a$ by the buff 126 and hence, it is possible to avoid a reduction in adhesive strength due to a strain of an adhesive surface. Then, the crude rubber sheet adhering device 127 and the clamp member 125 are retracted upwards to complete the tire tube 2 (see FIG. 27G). In the tire tube 2 immediately after being completed, the sealant 7 stays on the bottom of the sealant chamber 6, but when the tire tube 2 is mounted to the tire body 1 and actually allowed to travel, the sealant 7 is diffused uniformly within the sealant chamber 6 by the action of centrifugal force.

A process of charging a sealant 7 according to a seventh embodiment of the present invention will be described below with reference to FIGS. 28H to 28J.

In the process of charging the sealant 7 according to the seventh embodiment, the first step to the abrading step using a buff 126 are the same as those in the sixth embodiment (see FIGS. 27A to 27F), but the step of closing a sealant charging bore 2$a$ is different from that in the sixth embodiment.

Figure 28H:
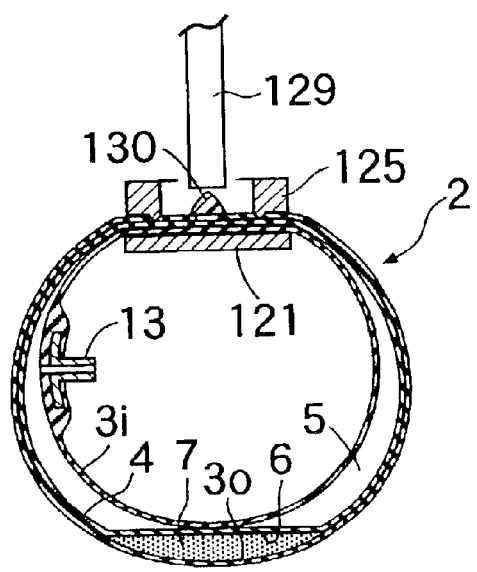
FIGS. 28H to 28J are views for explaining a sealant charging process according to a seventh embodiment of the present invention.
Figure 28I:
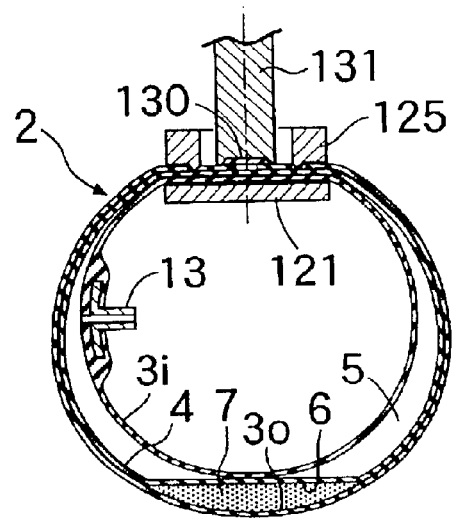
Figure 28J:
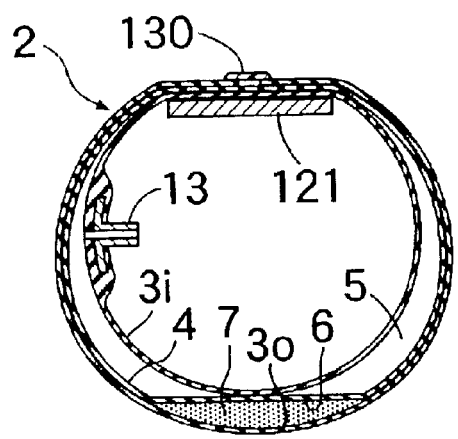

More specifically, an acrylic or urethane-based thermosetting resin 130 is supplied as a sealer from the sealer supply nozzle 129 to the periphery of the sealant charging bore 2$a$ abraded by the buff 126 (see FIG. 28H). After the sealer supply nozzle 129 is retracted upwards, the thermosetting resin 130 is then heated for 15 to 30 seconds and formed into a predetermined shape by a forming die 131 heated to approximately 180° (see FIG. 28I). When the thermosetting resin 130 is cooled and cured, the sealant charging bore 2$a$ is closed, and in this manner, a tire tube 2 is completed (see FIG. 28J). During the step of closing the sealant charging bore 2$a$, the clamp member 125 is clamping the periphery of the sealant charging bore 2$a$ to surround it.

A process of charging the sealant 7 according to an eighth embodiment of the present invention will be described below with reference to FIGS. 29K and 29M.

Even in the process of charging the sealant 7 according to the eighth embodiment, the first step to the abrading step using the buff 126 are the same as those in the sixth embodiment(see FIGS. 27A to 27E), but the step of closing the sealant charging bore 2$a$ is different from that in the sixth embodiment, as is in the seventh embodiment.

Figure 29K:
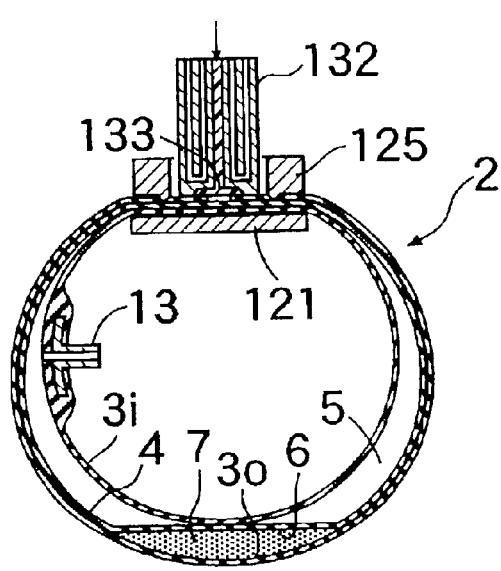
FIGS. 29K to 29M are views for explaining a sealant charging process according to an eighth embodiment of the present invention.
Figure 29L:
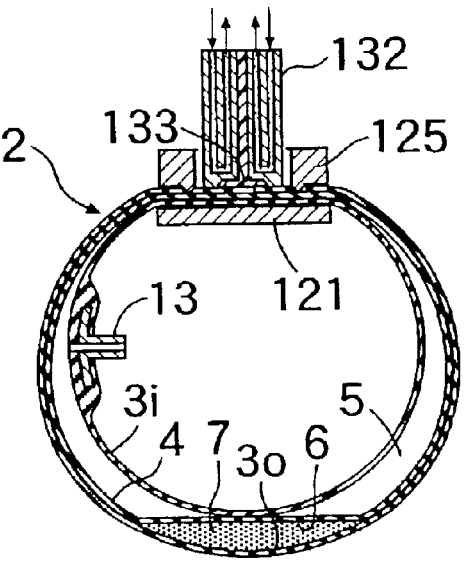
Figure 29M:
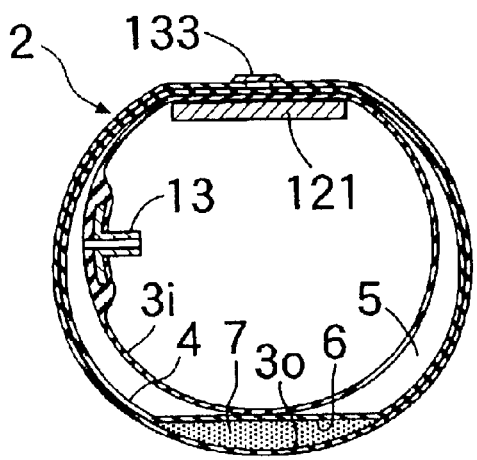

More specifically, a forming die 132 is put into abutment against the periphery of the sealant charging bore 2$a$ abraded by the buff 126, and a molten hot-melt resin 133 is injected through the inside of the forming die 132 (see FIG. 29K). Subsequently, cooling water is allowed to flow through the inside of the forming die 132 to cool and solidify the hotmelt resin 133 (see FIG. 29L), thereby closing the sealant charging bore 2$a$ by the solidified hot-melt resin 133 to complete the tire tube 2 (FIG. 29M). During the step of closing the sealant charging bore 2$a$, the clamp member 125 is clamping the periphery of the sealant charging bore 2$a$ so as to surround it.

As described above, according to each of the seventh and eighth embodiments, the sealant charging bore 2$a$ is closed by the thermosetting resin 130 or the hot-melt resin 133 in a state in which the periphery of the sealant charging bore 2$a$ has been clamped by the clamp member 125. Therefore, it is possible to prevent air from entering again through the sealant charging bore 2$a$ into the sealant chamber 6 which once depleted air and moreover, it is possible to close the sealant charging bore 2$a$ in a short time, as compared with a case where the crude rubber sheet 128 is adhered to the sealant charging bore 8$a$. In addition, it is possible to enhance the closing strength provided by the thermosetting resin 130 or the hot-melt resin 133 by previously buffing the periphery of the sealant charging bore 2a.

Figure 30A:
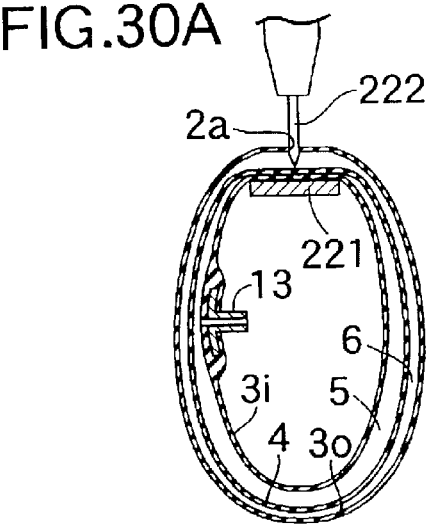
FIGS. 30A to 30H are views for explaining a sealant charging process according to a ninth embodiment of the present invention.

Next, a process of charging a sealant 7 according to a ninth embodiment of the present invention will be described below with reference to FIGS. 30A to 20H.

First, a tire tube 2, into which a sealant 7 is still not charged, is placed so that its inner surface (its air chamber peripheral wall portion 3i) is supported on an upper surface of a support plate 221 disposed horizontally. A hot nail 222 heated to about 400° C. by an electric heater is dropped toward a support plate 221 from the above to make a sealant charging bore 2a in an outer peripheral surface (the sealant chamber peripheral wall portion 3o) of the tire tube 2. By using the hot nail 222 heated in the above manner, the sealant charging bore 2a can be simply and reliably formed in the tire tube 2 made of a rubber (see FIG. 30A).

Figure 30B:
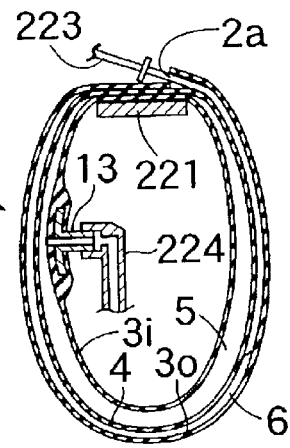
Figure 30C:
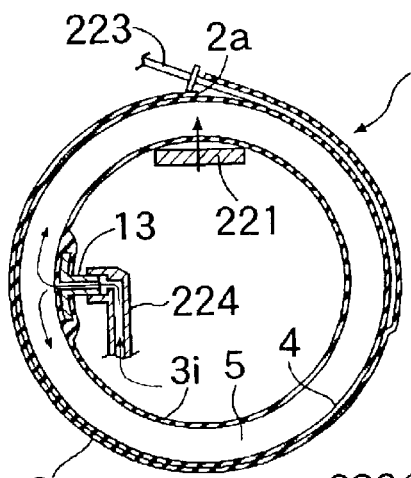
Figure 30D:
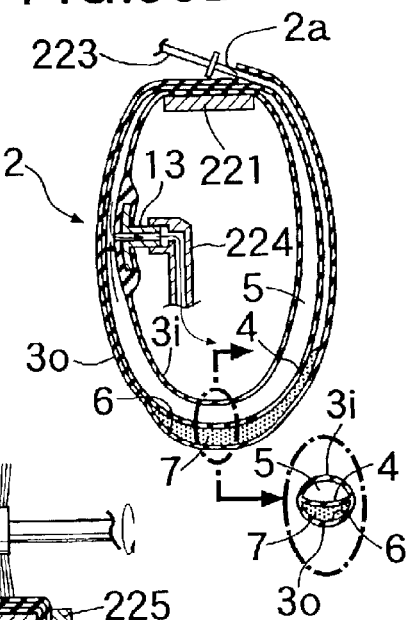

After the hot nail 222 is retracted upwards, a sealant injecting hose 223 is inserted through the sealant charging bore 2a into the sealant chamber 6 toward the bottom thereof, and at the same time, an air nozzle 224 connected to a pressure source such as a compressor is connected to a pneumatic valve 13 to supply air into the air chamber 5 in the tire tube 2 (see FIG. 30B). This causes the air chamber 5 to be expanded, whereby the air within the sealant chamber 6 adjacent the air chamber 5 with the partition wall 4 interposed therebetween is discharged to the outside through the sealant charging bore 2a (see FIG. 30C).

Then, the sealant 7 is charged into the bottom of the sealant chamber 6 through a sealant injecting hose 223, while discharging air within the air chamber 5 through the pneumatic valve 13 and the air nozzle 224. Since the sealant 7 is charged to the bottom of the sealant chamber 6 through the sealant injecting hose 223, while discharging the air within the air chamber 5 through the pneumatic valve 13 and the air nozzle 224 as described above, the sealant 7 can be easily charged without application of a specially strong pressure, while preventing the air from flowing again into the sealant chamber 6 through the sealant charging bore 2a.

Figure 30E:
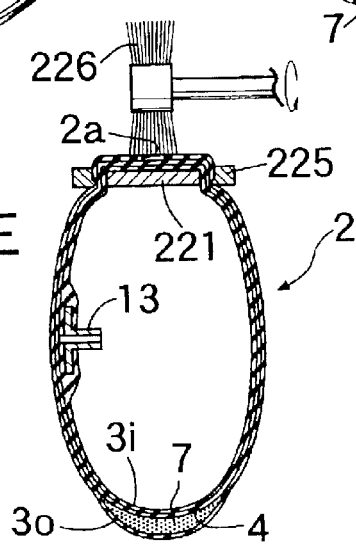

Then, the air nozzle 224 is retracted from the pneumatic valve 13 and thereafter, the clamp member 225 is lowered to clamp the periphery of the sealant charging bore 2a by cooperation with the support plate 221, so that air is prevented from entering the sealant chamber 6. Then, the periphery of the sealant charging bore 2a is abraded by the buff 226 which is being rotated, thereby removing oil and a stain deposited on the periphery of the sealant charging bore 2a (see FIG. 30E). At this time, a load is applied to the periphery of the sealant charging bore 2a by the buff 226 which is being rotated, but it is possible to reliably prevent the tire tube 2 from being deformed and damaged by a frictional force received from the buff 226, because such periphery is non-movably clamped by the clamp member 225.

Figure 30F:
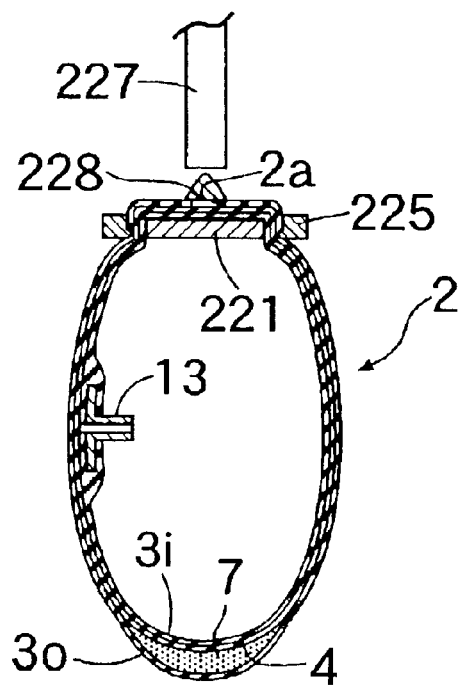
Figure 30G:
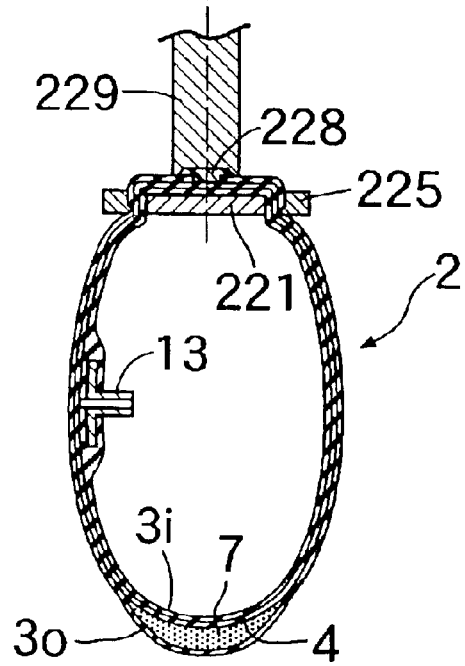
Figure 30H:
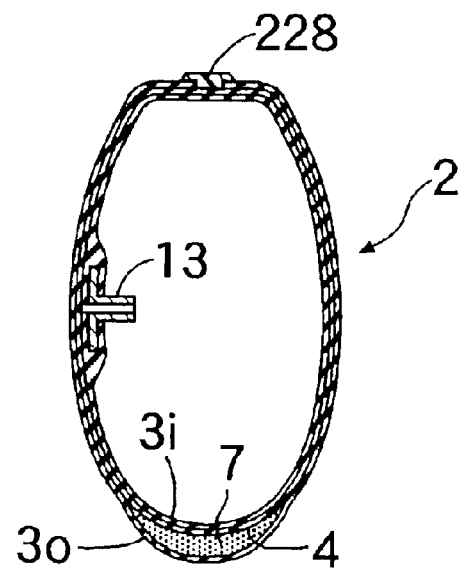

Then, an acrylic or urethane-based thermosetting resin 228 is supplied as a sealer from a sealer supply nozzle 227 to the periphery of the sealant charging bore 2a abraded by the buff 226 (see FIG. 30F). After the sealer supply nozzle 227 is retracted upwards, the thermosetting resin 228 is then heated for 15 to 30 seconds and formed into a predetermined shape by a forming die 229 heated to approximately 180° (see FIG. 30G). When the thermosetting resin 228 is cooled and cured. the sealant charging bore 2a is closed, and in this manner, a tire tube 2 is completed (see FIG. 30H). During the step of closing the sealant charging bore 2a, the clamp member 225 is clamping the periphery of the sealant charging bore 2a so as to surround it.

According to the ninth embodiment, the sealant charging bore 2a is closed by the thermosetting resin 228 in a state in which the periphery of the sealant charging bore 2a is clamped by the clamp member 225, as described above. Therefore, it is possible to prevent air from entering again through the sealant charging bore 2a into the sealant chamber 6 which once depleted air and moreover, it is possible to close the sealant charging bore 2a in a short time, as compared with a case where the crude rubber sheet is adhered to the sealant charging bore 2a. In addition, it is possible to enhance the closing strength provided by the thermosetting resin 228 by previously abrading the periphery of the sealant charging bore 2a by the buff. Further, the thermosetting resin 228 is heated and pressed by the forming die 229 and hence, the thermosetting resin 228 is smoothly integrated with the tire tube 2, leading to an enhanced appearance.

As an alternative to the ninth embodiment, the sealant charging bore 2a can be closed by the crude rubber sheet, in place of being closed by the thermosetting resin 228. The closing of the sealant charging bore 2a by the crude rubber sheet can be conducted in the same procedure as that described in the sixth embodiment with reference to FIGS. 27C to 27G.

Although the embodiments of the present invention have been described in detail, it will be understood that the present invention is not limited to the above-described embodiments, and various modifications in design may be made without departing from the spirit and scope of the invention defined in claims.

For example, in each of the sixth to eighth embodiments, the sealant injecting hose 123 may be inserted into the sealant chamber 6 through the sealant charging bore 2a; the air may be supplied into the air chamber 5 in the tire tube 2, and the sealant 7 may be then charged into the sealant chamber 6 through the sealant injecting hose 123, while discharging the air from the air chamber 5, as is in the ninth embodiment. In this case, it is possible to further effectively prevent the incorporation of the air into the sealant chamber 6.

In addition, if the sealant charging bore 2a is formed in the outer peripheral wall of the tire tube 2 in the course of producing the tire tube 2 in each of the sixth to ninth embodiments, the number of producing steps can be reduced.

Further, in the ninth embodiment, the sealant charging bore 2a may be closed by bringing the forming die into abutment against the periphery of the sealant charging bore 2a and injecting a molten hot-melt resin through the inside of the forming die, in place of being closed by the thermosetting resin 228. In addition, the step of supplying the air into the air chamber 5 through the pneumatic valve 13 mounted in the tire tube 2 and the step of inserting the sealant injecting hose 223 into the sealant chamber 6 through the sealant charging bore 2a may be conducted simultaneously, or the air may be supplied into the air chamber 5 after insertion of the sealant injecting hose 223.

INDUSTRIAL APPLICABILITY

As discussed above, the present invention is applicable to a sealant-incorporated tire which includes a loop-shaped sealant chamber defined along an inner peripheral surface of a tire body and partitioned from an air chamber by an inner liner and a sealant charged in the sealant chamber, or a sealant-incorporated tire tube which is provided therein with an air chamber filled with air and a sealant chamber filled with a sealant.

What is claimed is:

1. A sealant charging process in a sealant-incorporated tire including a loop-shaped sealant chamber (6) defined along an inner peripheral surface of a tire body (1) and partitioned from an air chamber (5) by an inner liner (8, 8'), and a sealant (7) charged in said sealant chamber (6), characterized in that said process comprises a first step of forming a sealant charging bore (8a) in said inner liner (8, 8') to communicate with said sealant chamber (6), a second step of charging the sealant (7) into said sealant chamber (6) through said sealant charging bore (8a), a third step of discharging air present in said sealant chamber (6) by evacuation, and a fourth step of closing said sealant charging bore (8a) in a state in which a periphery of said sealant charging bore (8a) has been clamped.

2. A sealant charging process in a sealant-incorporated tire according to claim 1, wherein said first step comprises forming the sealant charging bore (8a) in said inner liner (8, 8') by an edge tool (70) mounted for advancing and retracting movements within a suction cup (65) connected to a vacuum source in a state in which the inner surface of said inner liner (8, 8') has been attracted and fixed by said suction cup (65).

3. A sealant charging process in a sealant-incorporated tire according to claim 1, wherein said fourth step comprises closing said sealant charging bore (8a) by adhesion of a crude rubber sheet (74) in a state in which the periphery of said sealant charging bore (8a) has been clamped.

4. A sealant charging process in a sealant-incorporated tire according to claim 1, wherein said fourth step comprises clamping the periphery of said sealant charging bore (8a), while discharging the air present in said sealant chamber (6) by evacuation, buffing the periphery of said sealant charging bore (8a) in a state in which said periphery has been clamped, and closing said sealant charging bore (8a) by adhesion of a crude rubber sheet (74).

5. A sealant charging process in a sealant-incorporated tire according to claim 1, wherein said fourth step comprises closing said sealant charging bore (8a) by a thermosetting resin (80) or a hot-melt resin (83) in a state in which the periphery of said sealant charging bore (8a) has been clamped.

6. A sealant charging process in a sealant-incorporated tire according to claim 1, wherein said fourth step comprises clamping the periphery of said sealant charging bore (8a), while discharging the air present in said sealant chamber (6) by evacuation, buffing the periphery of said sealant charging bore (8a) in a state in which said periphery has been clamped, and closing said sealant charging bore (8a) by a thermosetting resin (80) or a hot-melt resin (83).

7. A sealant charging process in a sealant-incorporated tire according to claim 1, wherein said loop-shaped sealant chamber is defined by connecting opposite ends of said inner liner (8) to the inner peripheral surface of said tire body (1).

8. A sealant charging process in a sealant-incorporated tire according to claim 1, wherein said loop-shaped sealant chamber (6) is defined by adhering a first inner liner (8) to the entire inner peripheral surface of said tire body (1), and connecting opposite ends of a second inner liner (2') to an inner peripheral surface of said first inner liner (8).

9. A sealant charging process in a sealant-incorporated tire tube (2) provided therein with an air chamber (5) filled with air and a sealant chamber (6) filled with a sealant (7), characterized in that said process comprises a first step of forming a sealant charging bore (2a) in an outer peripheral wall of said tire tube (2) to communicate with said sealant chamber (6), a second step of charging the sealant (7) into said sealant chamber (6) through said sealant charging bore (2a), a third step of discharging air present in said sealant chamber (6) by evacuation, and a fourth step of closing said sealant charging bore (2a) in a state in which a periphery of said sealant charging bore (2a) has been clamped.

10. A sealant charging process in a sealant-incorporated tire tube according to claim 9, wherein said first step comprises forming said sealant charging bore (2a) in the outer peripheral wall of said tire tube (2) by a hot nail (122) in a state in which an inner peripheral wall of said tire tube (2) has been supported.

11. A sealant charging process in a sealant-incorporated tire tube according to claim 9, wherein said fourth step comprises closing said sealant charging bore (2a) by adhesion of a crude rubber sheet (128) in a state in which the periphery of said sealant charging bore (2a) has been clamped.

12. A sealant charging process in a sealant-incorporated tire tube according to claim 9, wherein said fourth step comprises clamping the periphery of said sealant charging bore (2a), while discharging the air present in said sealant chamber (6) by evacuation, buffing the periphery of said sealant charging bore (2a) in a state in which said periphery has been clamped, and closing said sealant charging bore (2a) by adhesion of a crude rubber sheet (128).

13. A sealant charging process in a sealant-incorporated tire tube according to claim 9, wherein said fourth step comprises closing said sealant charging bore (2a) by a thermosetting resin (130) or a hot-melt resin (133) in a state in which the periphery of said sealant charging bore (2a) has been clamped.

14. A sealant charging process in a sealant-incorporated tire tube according to claim 9, wherein said fourth step comprises clamping the periphery of said sealant charging bore (2a), while discharging the air present in said sealant chamber (6) by evacuation, buffing the periphery of said sealant charging bore (2a) in a state in which said periphery has been clamped, and closing said sealant charging bore (2a) by a thermosetting resin (130) or a hot-melt resin (133).

15. A sealant charging process in a sealant-incorporated tire tube according to claim 9, wherein said second step comprises inserting a sealant injecting hose (123) into said sealant chamber (6) through said sealant charging bore (2a), and supplying air into said air chamber (5) in said tire tube (2) and then charging the sealant (7) into said sealant chamber (6) through said sealant injecting hose (123), while discharging the air from said air chamber (5).

16. A sealant charging process in a sealant-incorporated tire tube according to claim 9, wherein said first step of forming said sealant charging bore (2a) in the outer peripheral wall of said tire tube (2) is carried out in a process of producing said tire tube (2).

17. A sealant charging process in a sealant-incorporated tire tube (2) provided therein with an air chamber (5) filled with air and a sealant chamber (6) filled with a sealant (7), characterized in that said process comprises a first step of forming a sealant charging bore (2a) in an outer peripheral wall of said tire tube (2) to communicate with said sealant chamber (6), a second step of inserting a sealant injecting hose (223) into said sealant chamber (6) through said sealant charging bore (2a) and supplying air into said air chamber (5) through a pneumatic valve (13) mounted in said tire tube (2), a third step of charging the sealant (7) into said sealant chamber (6) through said sealant injecting hose (223), while discharging the air present in said air chamber (5) through said pneumatic valve (13), a fourth step of buffing the periphery of said sealant charging bore (2a) in a state in which said periphery has been clamped, and a fifth step of closing said sealant charging bore (2a) by a thermosetting resin (228) or a hot-melt resin in a state in which the periphery of said sealant charging bore (2a) has been clamped.

18. A sealant charging process in a sealant-incorporated tire tube according to claim 17, wherein said fifth step comprises depositing the thermosetting resin (228) to the periphery of said sealant charging bore (2a) and then heating and pressing said thermosetting resin (228) to close said sealant charging bore (2a).

19. A sealant charging process in a sealant-incorporated tire tube (2) provided therein with an air chamber (5) filled with air and a sealant chamber (6) filled with a sealant (7), characterized in that said process comprises a first step of forming a sealant charging bore (2a) in an outer peripheral wall of the tire tube (2) to communicate with said sealant chamber (6), a second step of inserting a sealant injecting hose (223) into said sealant chamber (6) through said sealant charging bore (2a) and supplying air into said air chamber (5) through a pneumatic valve (2) mounted in said tire tube (2), a third step of charging the sealant (7) into said sealant chamber (6) through said sealant injecting hose (223), while discharging the air present in said air chamber (5) through said pneumatic valve (13), a fourth step of buffing the periphery of said sealant charging bore (2a) in a state in which said periphery has been clamped, and a fifth step of closing said sealant charging bore (2a) by adhesion of a crude rubber sheet in a state in which the periphery of said sealant charging bore (2a) has been clamped.

20. A sealant charging process in a sealant-incorporated tire tube according to claim 19, wherein said fifth step comprises clamping the periphery of said sealant charging bore (2a), while discharging the air present in said sealant chamber (6) by evacuation, buffing the periphery of said sealant charging bore (2a) in a state in which said periphery has been clamped, and closing said sealant charging bore (2a) by adhesion of a crude rubber sheet.

21. A sealant charging process in a sealant-incorporated tire tube according to claim 17 or 19, wherein said first step of forming said sealant charging bore (2a) in the outer peripheral wall of said tire tube (2) is carried out in a process of producing said tire tube (2).

* * * * *